United States Patent
Walker et al.

(10) Patent No.: US 10,868,675 B2
(45) Date of Patent: Dec. 15, 2020

(54) AUTOMATED MANAGEMENT OF ENDPOINTS

(71) Applicant: Kaseya International Limited, Dublin (IE)

(72) Inventors: Olof Robert Walker, Sundsvall (SE); David Ohlen, Sundsvall (SE); Nigel Pattinson, Lexington, MA (US); Johan Tobias Peciva, Lexington, MA (US); Prakash Khot, Gachibowli (IN)

(73) Assignee: KASEYA INTERNATIONAL LIMITED, Dublin (IE)

( * ) Notice: Subject to any disclaimer, the term of this patent is extended or adjusted under 35 U.S.C. 154(b) by 0 days.

(21) Appl. No.: 14/722,282

(22) Filed: May 27, 2015

(65) Prior Publication Data
US 2016/0350093 A1    Dec. 1, 2016

(51) Int. Cl.
| | | |
|---|---|---|
| G06F 9/445 | (2018.01) | |
| H04L 9/32 | (2006.01) | |
| G06F 21/57 | (2013.01) | |

(52) U.S. Cl.
CPC ............ *H04L 9/3247* (2013.01); *G06F 21/57* (2013.01)

(58) Field of Classification Search
CPC .................................................... G06F 21/57
USPC ....................................................... 717/178
See application file for complete search history.

(56) References Cited

U.S. PATENT DOCUMENTS

| | | | |
|---|---|---|---|
| 8,978,106 B2* | 3/2015 | Swamy ................... | G06F 17/00 705/27.1 |
| 2003/0051159 A1* | 3/2003 | McCown ............. | H04N 7/1675 726/5 |
| 2006/0248406 A1* | 11/2006 | Qing ......................... | G06F 8/31 714/38.14 |
| 2008/0127169 A1* | 5/2008 | Malasky ................... | G06F 8/61 717/174 |
| 2008/0148298 A1* | 6/2008 | Chatterjee ............... | G06F 21/54 719/328 |
| 2009/0210702 A1* | 8/2009 | Welingkar .............. | H04L 9/321 713/156 |
| 2014/0289368 A1* | 9/2014 | Benitez .................. | H04L 67/06 709/219 |

OTHER PUBLICATIONS

U.S. Appl. No. 14/722,351, filed May 27, 2015, Prakash Khot et al.
U.S. Appl. No. 14/722,330, filed May 27, 2015, Mark Fischer et al.
U.S. Appl. No. 14/722,369, filed May 27, 2015, Prakash Khot et al.
U.S. Appl. No. 14/722,403, filed May 27, 2015, Mark Fischer et al.

\* cited by examiner

*Primary Examiner* — Hang Pan
(74) *Attorney, Agent, or Firm* — Maschoff Brennan

(57) ABSTRACT

Techniques for packaging executable code are described. The techniques involve encapsulating the executable code into an extension that has a generated manifest structure that includes a human readable manifest and a machine readable version of the human readable manifest. The manifest structure is packaged into the extension containing the executable code and signed with a private key. Upon receipt by user device the extension by using a first private key is inspected and signed by the user device applying a second digital signature to the extension.

26 Claims, 13 Drawing Sheets

AUTOMATED MANAGEMENT OF ENDPOINTS

BACKGROUND

This description relates to management of large scale computer networked systems such as in cloud computing.

Cloud computing is a type of computing where large groups of remote servers are networked together to access centralized data storage, computing services and/or resources. Clouds can be classified as public or private and can be used by relatively small users, such as small to mid-size businesses, as well as very large enterprise-scale users, such as large organizations, government, and so forth. Approaches to cloud computing can differ depending on the size of the organization. One approach to cloud computing for the relatively small user is for such users to purchase third party user software tools that are managed/built on user premises. While relatively inexpensive in comparison to approaches used by larger organizations that operate their own clouds there are nonetheless several drawbacks to this approach.

A runtime environment can be used to provide tools that are distributed to customer devices that are remotely managed through a cloud computing environment. One technique for distributing such tools uses script functions. Scripts or scripting functions as used herein refer to functions written for a special run-time environment, which are interpreted (rather than compiled) in order to automate execution of certain types of computer tasks that could be performed manually by a user.

SUMMARY

In remote management and monitoring for disparate, e.g., small scale users there is likely an enormous set of different software and hardware in need of remote monitoring and management. From a supplier perspective, it becomes difficult to plan and anticipate all potential different combinations of hardware and software that customers may have.

Using scripts to provide an extensible cross platform runtime environment for automated management has several drawbacks. For example, scripts may depend on external resources that may need to be installed separately on each managed endpoint. The user of the scripts cannot validate that the scripts performed the functions indicated by a description of the script. The user thus has to trust the script writer not to perform any malicious activity on the endpoint. A script could be changed since the script was last uploaded by the author of the script without the user knowing that it had been changed. Script may only run on a particular platform supporting a particular runtime environment/operating system.

According to an aspect, a system comprises a processor device, a memory in communication with the processor device, and a storage device that stores a program of computing instructions for execution by the processor using the memory. The program comprises instructions to configure the system to receive executable code, encapsulate the executable code into an extension and upload the extension to an approval system that executes an approval process. The system is further configured to generate a manifest structure, the manifest structure including a document that is a human readable manifest and a machine readable manifest that is version of the human readable manifest, package the manifest structure into the extension containing the executable code and apply a digital signature to the extension by using a private key.

According to an additional aspect, a method includes receiving by one or more computer systems executable code, encapsulating by the one or more computer systems the executable code into an extension, uploading by the one or more computer systems the extension to an approval system that executes an approval process, generating by the one or more computer systems a manifest structure, the manifest structure including a document that is a human readable manifest and a machine readable version of the human readable manifest, packaging by the one or more computers the manifest structure into the extension containing the executable code, and signing the extension, by the one or more computers applying a digital signature to the extension that has the manifest structure and the executable code, by using a private key.

According to an additional aspect, a computer program product tangibly embodied on a digital hardware storage device, the computer program product for packaging executable code, the computer program product comprising instructions for causing a processor to receive executable code, encapsulate the executable code into an extension, upload the extension to an approval system that executes an approval process, generate a manifest structure, the manifest structure including a document that is a human readable manifest and a machine readable manifest that is version of the human readable manifest, package the manifest structure into the extension containing the executable code, apply a digital signature to the extension by using a private key.

The following are some additional features within these aspects.

The manifest is programmatically generated, with the human readable manifest and machine readable manifest generated from source code used to produce the executable code packaged in the extension. The human readable manifest enables an end-user to determine contents of the extension and the machine readable version loads the only those functions listed in the manifest that are part of the executable code in the extension, thus effectively stripping out function calls from loaded libraries to make it impossible to call a function that is not in the manifest presented to the user. The signed extension is stored into a storage structure and publicized of the availability of the signed extension. A download request for the signed extension can be received. A scripting program editor is used to produce the executable code.

According to an additional aspect, a method includes receiving by a first system, from one or more computer systems in response to a download request for an extension, the extension that comprises executable code and a human readable manifest corresponding to the executable code, the extension being an approved extension that packages the manifest structure and the executable code, and which is signed by a first applied digital signature to the extension using a first private key, receiving by the first system, the first digital signature to enable inspection of the extension, and signing by the first system the extension by a user applying a second digital signature to the extension.

System and computer program product aspects are also included as analogous aspects.

The following are some additional features within these aspects.

Generating the machine readable manifest strips out one or more function calls from one or more loaded libraries to prevent one or more function calls that are not in the human readable manifest. The device comprises a runtime environment that includes an application programming interface, a glue layer and a virtual machine that executes the executable code, with the glue layer providing an application programming interface (API) access from the virtual machine that contains cross platform functions used by the executable code to access and manipulate the device outside of the virtual machine.

The above techniques can include additional features and one or more of the following advantages.

The described techniques provide a cross platform runtime environment that can improve portability and security by bundling code and manifest information together in a signed binary extension. The extension provides a human readable manifest with information on what actions the extension will perform and the machine readable manifest reduces potential security issues by only loading application program interface functions (API functions) that are specified in the machine readable manifest. These techniques enable both the publisher and the customer of the extension, to sign the extension; validating the integrity of the extension, e.g., by the publisher and permission, e.g., by the customer to enable the extension to execute in the customer's network.

The details of one or more embodiments of the invention are set forth in the accompanying drawings and the description below. Other features, objects, and advantages of the invention are apparent from the description and drawings, and from the claims.

DETAILED DESCRIPTION

Figure 1:
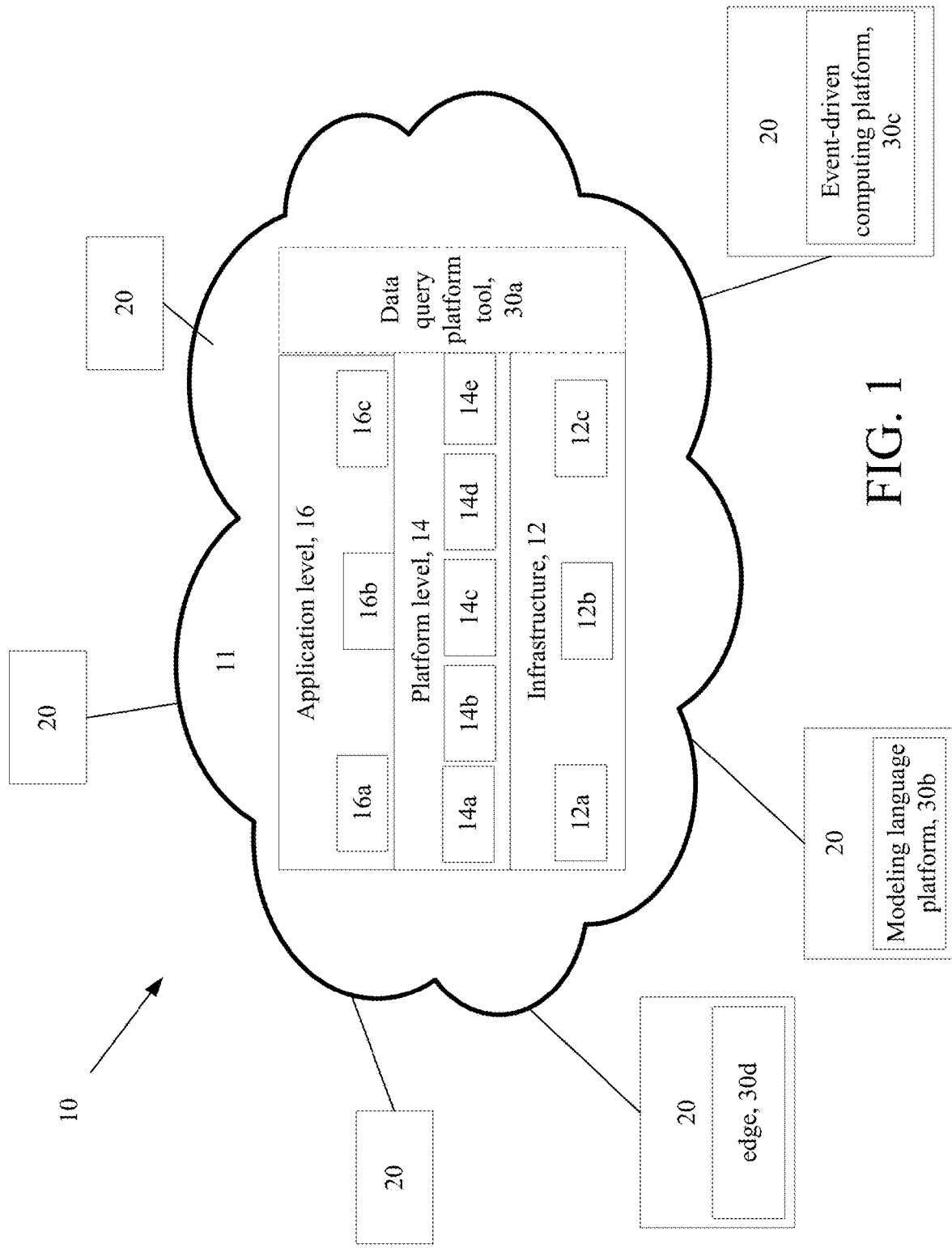
FIG. 1 is a block diagram of a cloud computing environment for using management tools for structured, non-structured, and semi-structured database server systems.

Referring now to FIG. 1, an example cloud computing environment 10 is shown. The cloud is a term that refers to a type of network 11 including an infrastructure level 12 including various infrastructure systems 12a-12c such as computing resources 12a, networking resources 12b, and storage resources 12c. The example cloud computing environment 10 also includes a platform level 14 including various platform services/systems 14a-14e such as target device communication services 14a, identity resources, 14b, runtime environment 14c, queues 14d and database/object storage systems 14e, e.g., a data fabric. The example cloud computing environment 10 also includes an application level 16 including various applications 16a-16e such as management tools 16a, content 16b, collaboration tools 16c and other types of user-applications. The example cloud computing environment 10 also includes customer devices 20 (also referred to herein as target devices 20) that connect to the cloud computing environment 10. Such devices 20 can be of any sort, including by way of example, desktop/laptop/tablet computers, computer servers, smart phones and other user/customer devices, as well as any internal networking devices that connect such devices in local networks and which in turn connect to the example cloud computing environment 10.

As also shown in FIG. 1, a data storage query platform tool 30a (FIG. 2), resides in the cloud, as shown, with the data storage query platform tool 30a built on top of infrastructure 12c and incorporated with platform level 14e (data fabric) and accessed by platform application level 16, as illustrated. Also shown is a modeling language platform 30b that resides on one or more client devices 20, an event driven computing platform 30c on one or more devices 20 and a programming structure platform 30d that resides on one or more devices 20.

Customers interact with the application level 16. Customer devices 20 are managed by the various applications within application level 16. Applications that are executed at application level 16 and various platform services within platform level 14 persist data via the "data fabric" service (14e) into the data storage platform (12c). The "data fabric" service figures out what storage device type or types (in 12c) in which to persist the data.

Described is a platform that allows application developers to build applications quickly and allow customers to build applications and combine data and non-object storage where developers can produce their own storage schemas. The described data fabric wraps queries to data storage of disparate types, while masking to the developer the various complexities of the disparate storage types. The data fabric includes tools that allow users to define queries using a query markup language for access to No-SQL databases. Thus, in the data fabric some databases are databased that store structured data, some databases store data that is semi structured and some store data that is unstructured data which can all be accessed with the same interface.

Figure 2:
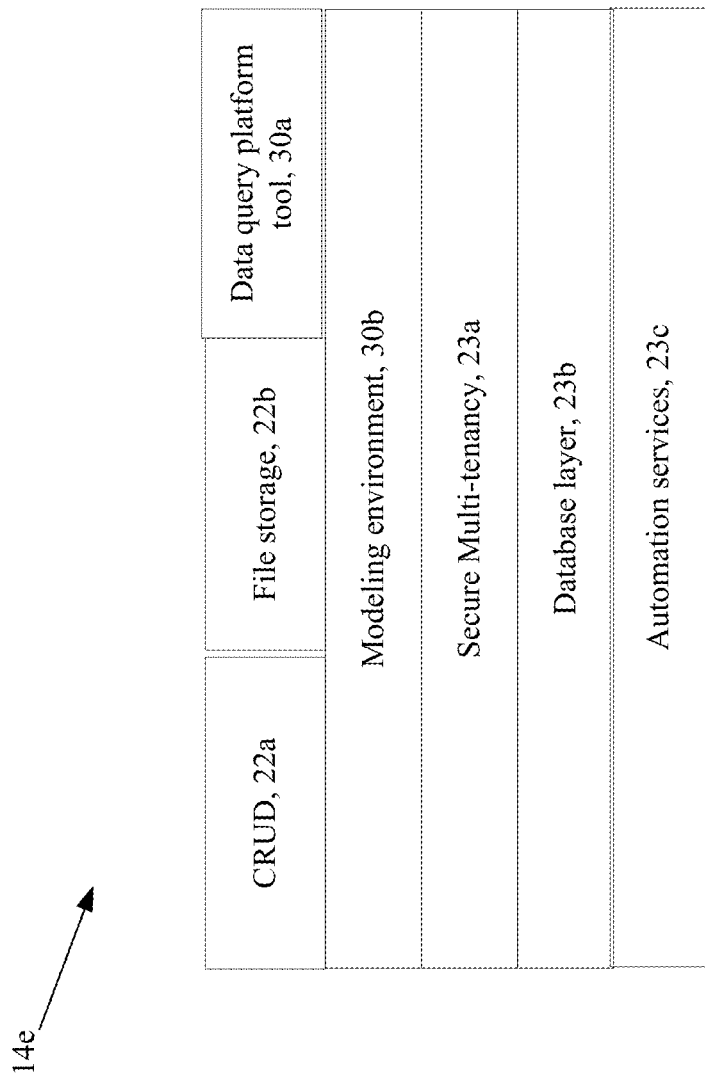
FIG. 2 is a block diagram showing an architectural view of the data fabric platform example.

Referring now to FIG. 2, this view of the data fabric 14e includes the data query platform tool 30a, CRUD tools 22a for create, read, update and delete functions in persistence storage and a cloud-based persistent file storage service 22b. The data fabric 14e also includes the modeling environment 30b, secure multi-tenancy application layer 23a, a database layer 23b and automation services 23c. The secure multi-tenancy application layer 23a is a software architecture where single instances of applications run on a server that serves multiple "tenants," i.e., groups of users that have the same view of the applications. In a multi-tenant architecture, a software application is designed to provide each tenant with a specific share of the instance including data, configuration, user management, tenant individual functionality and non-functional properties. Multi-tenancy contrasts with multi-instance architectures where separate software instances operate on behalf of different tenants.

The data fabric 10 provides customers the ability to customize entities and produce new entities to make the data fabric 14e specific to a customer's needs, provides web service APIs to import and export customer data, including faceted queries over raw datasets and analytic models, with high levels of security, durability and high availability (which can included multi-site replication for disaster recovery that can be scaled.

Figure 3:
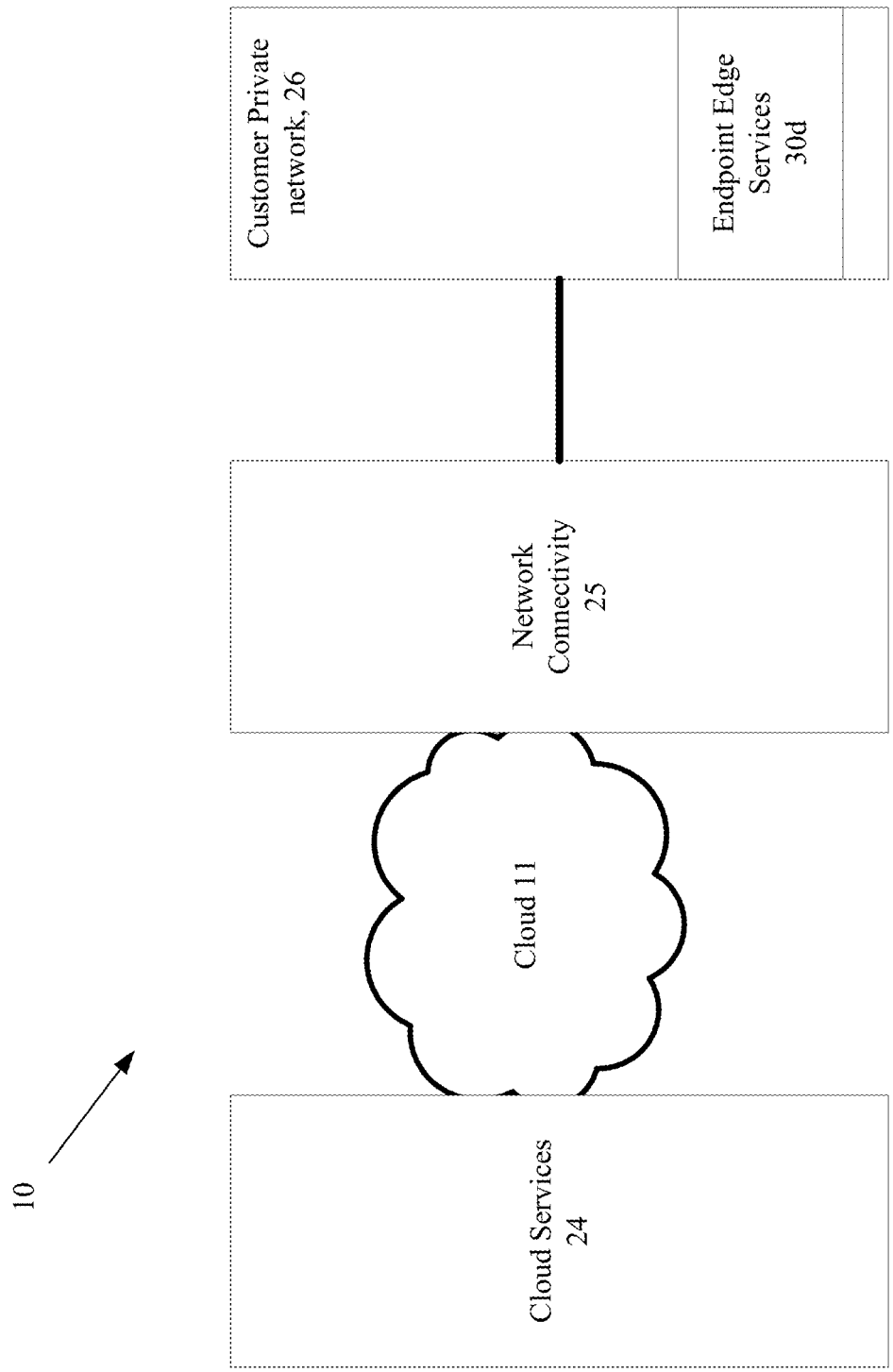
FIG. 3 is a block diagram showing an architectural view of the data fabric platform to client endpoint with access for cloud services.

Referring now to FIG. 3, an overall view of the cloud from cloud services 24 to a customer's private network 26 is shown. Cloud services 24 include tools provided to aid customer's use of the "cloud." For example, the tools mentioned below (not shown in FIG. 3) including techniques for defining and creating data entities, i.e., data objects, tools that produce and execute queries that are expressed in a standard syntax wrapped query language, tools for providing endpoint edge services, and tools for providing an automation service—event processing flow. These cloud services 24 are engaged with through the cloud from a customer's private network 26, via conventional network connectivity layers 25 that can comprise local area networks, virtual private networks, dedicated links and the public Internet. On the customer's private network are run endpoint services 30d such as those discussed below.

Figure 4:
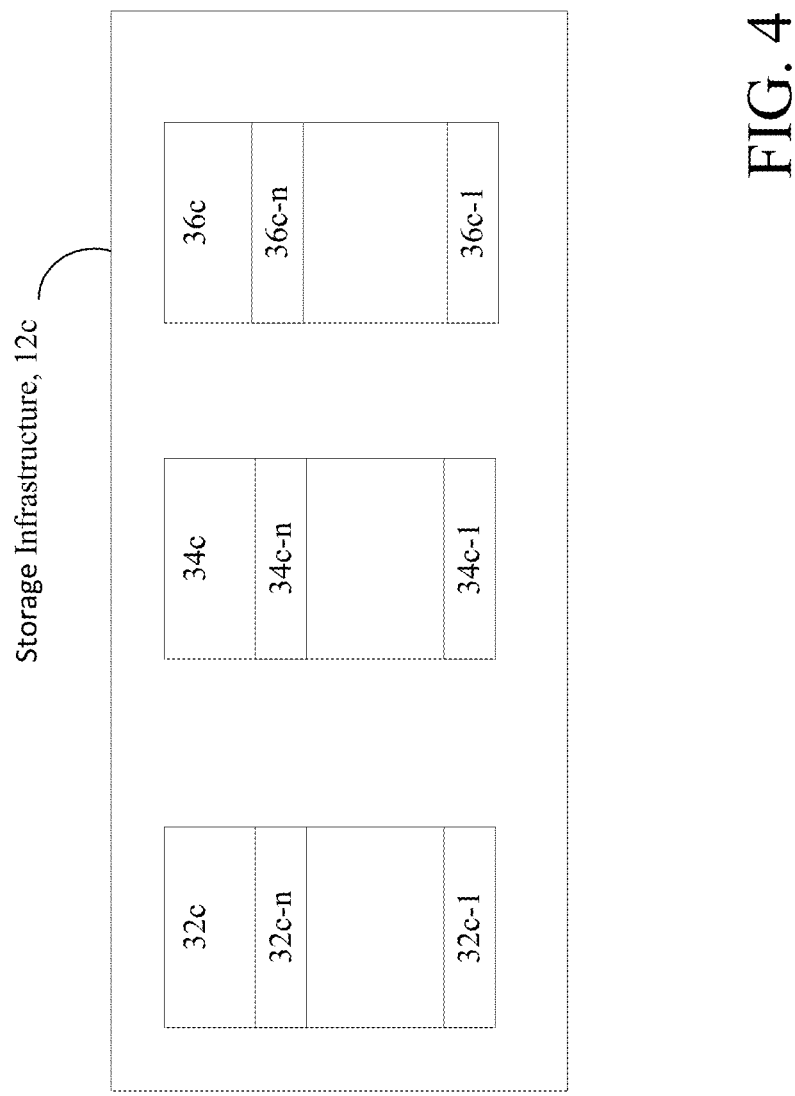
FIG. 4 is a block diagram showing an example of a cloud based data storage platform.

Referring now to FIG. 4, the data storage platform 12c is shown. The data storage platform 12c includes multiple systems and persists data from platform level 14e (data fabric) and executes queries from the data storage query platform tool 30a that are expressed in the standard syntax wrapped query language. Customers and customer devices do not directly interact with data storage query platform tool 30a. Data storage query platform tool 30a receives queries expressed in standard syntax wrapped query language from various applications within application level 16 and various platform services within level 14. The data storage query platform tool 30a tool translates these standard syntax wrapped query language queries into the appropriate native query language used by the various data storage platforms in layer 12c. The data storage query platform tool 30a tool executes the query against the applicable data storage platform(s) in 12c, retrieves the query results, translates the results into a common query results structure, and returns the common query results structure to the calling routine from various applications within application level 16 and various platform services within platform level 14.

The data storage platform 12c is built on "NoSQL" server databases that provide storage and retrieval of data modeled in forms besides the tabular relations used in relational databases. NoSQL databases use key-value, graph, or document structures, and thus differ from those used with relational databases. Accordingly, some operations are performed faster in a NoSQL server while others may not be.

The data storage platform 12c includes a first storage entity 32c that includes one or plural ones, e.g., 32c-1 to 32c-n of distributed database management systems that handle large amounts of data across many commodity servers, providing high availability with no single point of failure and which support clusters spanning multiple datacenters, with asynchronous master-less replication allowing low latency operations for all clients. An exemplary server 32c is the so called Cassandra (Apache Project). These NOSQL servers 32c-1 to 32c-n provide simplicity of design, horizontal scaling, and finer control over availability.

The data storage platform 12c includes a second storage entity 34c that includes one or plural index storage systems 34c-1 to 34c-n that provide a distributed, multitenant-capable full-text search engine with a Java API interface, a RESTful web interface and schema-free JSON documents. One example of the second storage entity 34c is Elasticsearch (Apache).

The data storage platform 12c also includes a third storage entity 36c that includes one or plural relational graph storage systems 36c-1 to 36c-n. A graph database is a type that is optimized for storing and querying graphs that have many, e.g., hundreds of billions of vertices and edges distributed across a multi-machine cluster. An exemplary "relational graph storage system" is Titan (DataStax). Titan is a transactional database that can support thousands of concurrent users executing complex graph traversals in real time.

The data storage platform 12c also includes a fourth storage entity 38c that includes one or plural binary large object (BLOB) storage systems 38c-1 to 38c-n. A BLOB data store is a type that is optimized for storing binary objects across a distributed multi-machine cluster. An exemplary BLOB data store is Ceph (Inktank Storage). Ceph uniquely delivers object, block, and file storage in one unified system.

One technique for defining and creating data entities, i.e., data objects, for use in the platform application is described below. Other techniques could be used with adjustments made to applications using the platform tool 30a, as well as, to the platform tool 30a. In the applications used with the platform tool 30a, the tools described below are used to produce specific data entities, or objects, as source code for use in programming the application.

These data entities are used by the "data fabric" platform to persist (create/read/update/delete) the underlying data into the appropriate data storage systems. When using the standard syntax wrapped query language to query the appropriate data storage systems, the query results are translated into a common query results structure that includes a collection of pertinent data entities (created by tools described below) for use by applications using the data storage query platform tool 30a tool.

Figure 5:
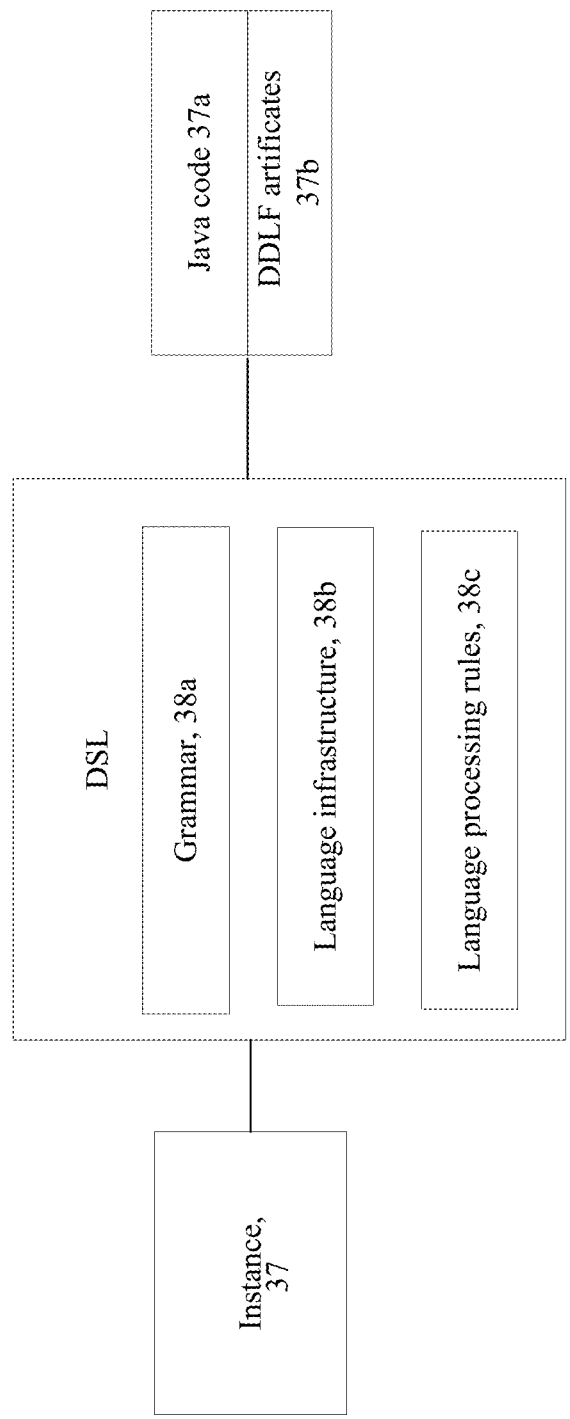
FIG. 5 is a block diagram showing an example of a modeling language platform.

Referring now to FIG. 5, data storage query platform tool 30a executes queries that are produced by a client 20 using a modeling language (ML) platform 30b that uses a language grammar 38a and a set of language processing rules 38b to transform instances 37 (any given instance of an entity written in the ML) written in the grammar 38a into Java code (JC) 37a and Data Definition Language artifact files 37b (DDLaf). In the example below "Person" is a simple instance of a ML entity. The example below includes sample code used to transform that entity into functional Java code.

The modeling language (ML) platform 30b also includes language infrastructure 38b. The ML language infrastructure are auto-generated pieces of software that are necessary to produce a system capable of recognized and acting on input in a given language. Below are a few examples of a ML syntax. When processed, a file containing ML is not read as-is, or as a whole, but rather it is deconstructed by the language infrastructure into recognizable pieces that allow further discrete operations to be performed. As with many computer languages, the infrastructure for ML has a grammar (i.e., a set of rules for specifying keywords (system-reserved words, such as "entity"), symbols (such as "{" and "}"), and user-defined words (such as using "Person" for the name of an entity). The grammar also specifies the order and specific combinations in which these symbols appear in a valid file.

In addition to the grammar are the scanner and parser that are used to read a ML file, find valid symbols (also called tokens), and parse these into pieces that can be re-used by the application code to act on ML input.

The Java code (JC) 37a and Data Definition Language artifact files 37b (DDLaf) can be used, e.g., for searching disparate databases on a data fabric. Thus, output of ML is functional Java code, that is, a transformation of a ML file into one or more compile-able Java classes that are to represent application data. Another output is the representation of the ML entity in a manner compatible with one or more database systems used by the data fabric platform. Examples of ML outputs DDL (Data Definition Language) statements that can be used in "Cassandra," database, (Apache Project) to allow that database system to store instances of ML entities on physical storage media.

The Java code 37a and Data Definition Language artifact files 37b (DDLaf) define one or more data types, e.g., "entities" into the Data Definition Language files (DDLaf) and artifact files for use in data fabric databases. The Java code 37a and Data Definition Language artifact files 37b (DDLaf) describe the logical structure of each entity with respect to a given database's conventions.

The general pattern of use is to define the structure of a data entity in ML is to transform that entity using the ML language into Java code, and pass instances of that data through the data fabric into one or more databases, which are permanent repositories of data, and against which queries, updates and deletes can be performed.

Instances of both Java code and DDL artifacts (e.g. Cassandra statements, as mentioned above), are produced by the language based on files written against the ML grammar.

A fragment of the grammar itself is shown below in Table 1:

TABLE 1

```
Entity:
    'entity' (name = ID) '{'
        (attributes = EntityAttribute)+
    '}'
```

This simplified example of a piece of the ML grammar, written in Extended Backus-Naur Form (EBNF), indicates that the symbolic "Entity" consists of the literal word 'entity', followed by an "ID" (defined elsewhere as, essentially, any word), followed by an "{", followed by one or more instances of "EntityAttribute" (defined elsewhere in the grammar, followed by a "}".

As shown in FIG. 5, instances 37 are file structures that are written in the grammar 32. The grammar 38a is specified using an Extended Backus-Naur Form (EBNF). Extended Backus-Naur Form (EBNF) is a family of meta-syntax notations that are extensions of the basic Backus-Naur Form (BNF) meta-syntax notation. Any of the EBNF notations can be used to express a context-free grammar. EBNF is used to make a formal description of, e.g., a computer programming language. The file instances 37 are fed to the modeling language platform (MLP) 30b, which processes the file instances 37 into the Java code 37a and Data Definition Language artifact files 37b (DDLaf) based on application of the grammar and the language processing rules, within the language infrastructure.

As described above, many domain-specific languages (DSLs) such as ML have a grammar, a scanner and a parser. Other items may be included, but these are the three main components. These components can be produced manually or generated by tools that understand how DSL languages work, and provides a mechanism for simplifying the process of producing a new language.

In the present case, the grammar for ML is supplied to a tool called "Xtext," which breaks down the grammar and automatically generates a corresponding scanner, parser, abstract syntax tree and other pieces necessary to use instances of ML in functional code. Using this tool, minimizes "assembly work" of building a language, and simplifies changes the grammar when necessary, and obtaining updated scanner, parser, etc. "Xtext" is a free and open-source tool licensed under the Eclipse Public License.

These other components are extended by the processing discussed above to transform data types as described in the model language used on the platform into the Java code that would be suitable for use by the rest of the data Fabric platform 10.

The domain specific language (DSL) allows simplified expression of data types to be used in one or more data storage services that can be part of a multi-tenant "data fabric" cloud service. The data fabric service provides a mechanism to access multiple independent data storage technologies (e.g. Cassandra (Apache Project) and Elastic Search (open source Lucene based search server) using each for its most-optimized purpose. The modeling language (ML) platform 30b together with storage technologies provides a capability to store, search and query against structured, semi-structured and unstructured data using a single comprehensive product, the data storage query platform tool 30a.

The modeling language (ML) platform 30b implements a data-definition language. The modeling language is the starting point for interaction with a data fabric, providing a simplified, compact feature set allowing developers to access the sophisticated capabilities of the underlying data fabric technologies without having to necessarily learn how to work with those technologies on their own. A principal benefit of data fabric is the ability to separate the conceptual expression of a data model from its underlying implementation (using ML), and to write queries against this data without using a product or vendor-specific language (e.g., by use of the data storage query platform tool 30a discussed below).

By using ML, developers describe a data model in the simplest possible terms, letting the language and other pieces of data fabric be responsible for the transformation of this model into functional software. This provides a compact, readable and validate-able documentation of the data model, separation of the data model from its underlying implementation (ML entities could be generated in C # instead of Java), and provides the ability for use of multiple database systems under a common interface.

The data fabric 14e operates against various databases of the No-SQL type, such as Cassandra, ElasticSearch, Titan and Ceph database systems. However, any or all of these could be removed or replaced with no changes to how ML works, or any existing ML instances. In this way, ML separates what the application programmer intends to do with their data from how data fabric intends to operate on that data. This differs from other related technologies, most notably Object Relational Mappers (ORMs) that generally require the user to have some knowledge and experience with the database product being targeted.

In addition, modeling language (ML) platform 30b can be operated in a multi-tenant data fabric context, freeing developers from having to maintain application or schematic separation of data elements belonging to different end users (tenants, or customers). The modeling language (ML) platform 30b also offers an abstraction on top of the data storage technologies that are targeted, allowing one or more of the storage technologies to be potentially replaced, without affecting the language grammar or its exposed features.

The modeling language (ML) platform 30b is implemented as a language plugin for development environments, such as Eclipse released under the terms of the Eclipse Public License, Eclipse SDK is free and open source software that offers end users syntax highlighting, compile-time error notifications, and seamless integration within a large Java project.

Table 2 below illustrates an exemplary ML file as might be produced by an end user of a system 20, as a more detailed language grammar example.

TABLE 2

```
schema AssetMonitoring {
    entity Component {
        name: string
    }
    @Taggable
    abstract entity BaseAsset {
        name: string
        manufacturer: facet string
        notes: text
    }
    entity Asset extends BaseAsset {
        components: list<Component>
        initialCreation: date default now
        lastCheckInTime: timestamp
        isOnline: bool
        nbrCheckIns: int default 0
    }
    entity NetworkAsset extends Asset {
        ipAddr: string
        macAddr: string
    }
}
```

The above example shows a simplified use case for a network asset model expressed in the modeling language ML. This is a representative but non-exhaustive example, demonstrating the following capabilities of the language:

a. Namespacing (semantic grouping) of entities via the schema keyword. This groups all contained entities under the same schema name, allowing identical entity names to exist in other schemas without collision.

b. Entity hierarchies: the abstract entity BaseAsset is "extended" by Asset and in turn by NetworkAsset, allowing propagation of properties from the top-level entity into the other entities.

c. Default values: the "initialCreation" and "nbrCheckIns" fields show that default values can be set on entity attributes without having to use explicit program code.

d. Referencing: the language allows referencing of other entities, as in the "components" property of Asset, which contains a collection of Component entities, which are also defined in this schema.

e. Tagging: The @Taggable notation on BaseAsset indicates that instance of Asset (including instances of BaseAsset and NetworkAsset) can be "tagged" with user-defined values. This allows arbitrary data to be attached to instances of ML entities at runtime without having to change the schema, or compile any code.

f. Faceting: On BaseAsset, the "manufacturer" property indicates that its values can be faceted. Faceting is a built-in analytical operation applied to all properties automatically when a query on the containing entity is executed. In its simplest form, faceting provides a count of all the different values contained in the property, but more advanced operations are possible as well (see query discussion below).

Figure 6:
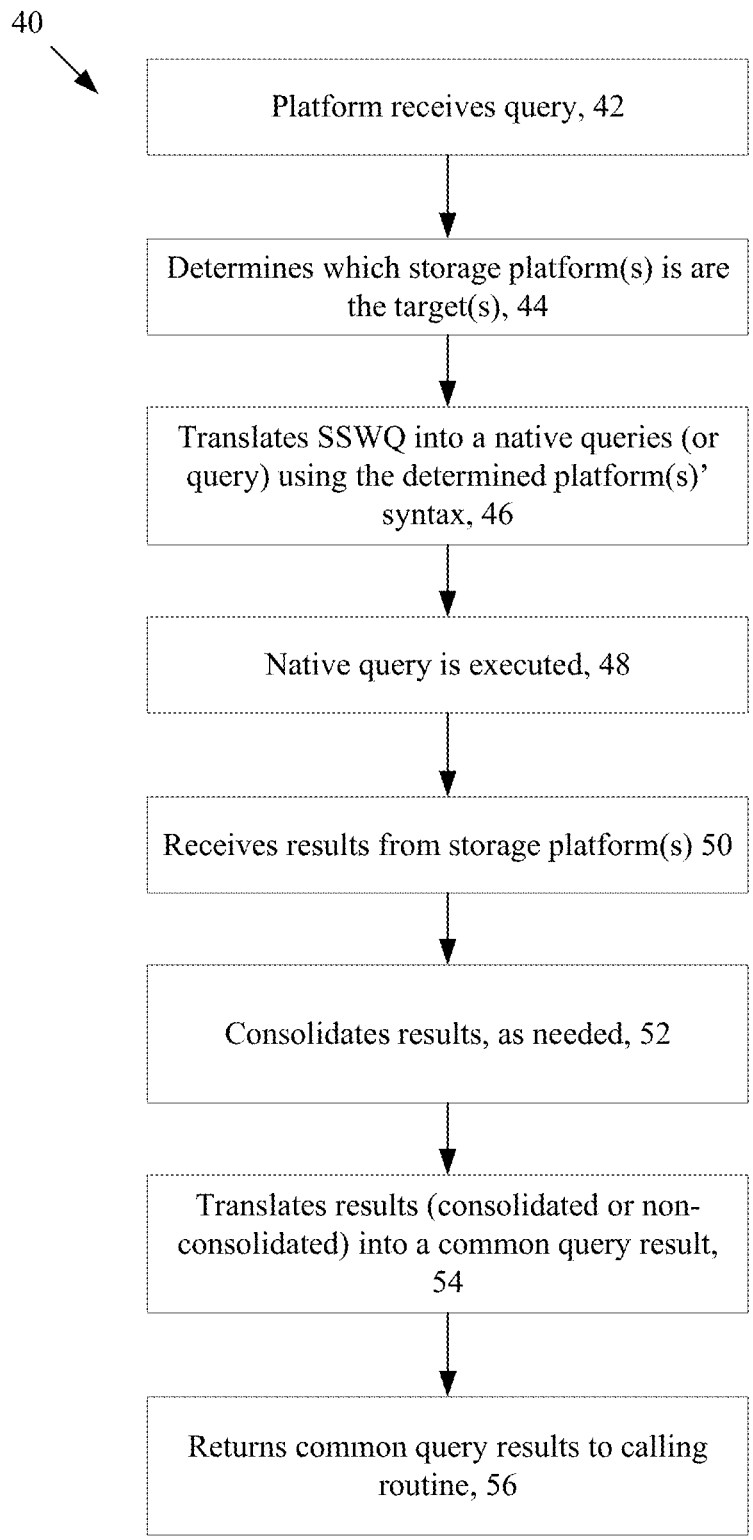
FIG. 6 is a flow chart depicting query processing to cloud storage.

Referring now to FIG. 6, each of the above data storage platforms uses specific query semantics. The data storage query platform tool 30a processes 40 a query by receiving 42 the query, and determining 44 which data storage platform or platforms against which to execute the desired query. The data storage query platform tool 30a determines 44 which storage platform is the target of the query. The data objects produced using an appropriate in technique such as that mentioned above is an object that represents a conceptual "record" or a single instance of a data element. The data object definition, as produced, contains metadata that describes the structure and types of data components within the object. A data element represented by an object typically contains data attributes, e.g., data properties. When the "data fabric" platform component 14e persists the data, the platform determines the appropriate data store based on the object's metadata, as follows: (1) The data attributes are stored in both the first storage entity 32c as structured data and also in the second storage entity 34c as an index-able document, (2) If the data element contains references to relationship graphs, the references are stored in 32c and 34c while the actual relationship graphs are stored in the third storage entity 36c. (3) If the data element contains references to BLOB objects, the references are stored in 32c and 34c while the actual BLOBs are stored in the fourth storage entity 38c.

When a standard syntax wrapped query is produced, the query takes as a parameter, an identifier to a specific object. The metadata specified in the object is used by the data storage query platform tool 30a to determine the data storage entity/entities from which to retrieve the data as follows: (1) If the query specifies a specific data element identifier (typically call a key), the data storage query platform tool 30a retrieves the data from the first storage entity 32c using the key as the efficient lookup value. (2) If the query specifies any query filters other than the key, the data storage query platform tool 30a retrieves the data from the second storage entity 34c using the filter element(s) for a full index search. If the object's metadata indicates the data element can contain references to relationship graphs and/or BLOBs and such references exist in the returned native query results, subsequent queries are executed against the third storage entity 36c for the referenced relationship graphs and/or against the fourth storage entity 38c for referenced BLOBs.

The data storage query platform tool 30a translates 46 the standard syntax wrapped query language into the determined data storage platform(s)' query semantics, by retrieving syntax for the determined storage platform and re-writing the SSW Query into a native query (or queries) using the determined storage platform(s)' semantics. The query is executed 48 on that determined platform(s).

The data storage query platform tool 30a receives 50 retrieved query results from each of the storage platform(s), consolidates 52 results, as appropriate, (if multiple storage platforms were queried) and translates 54 the results into a common query results structure that includes a collection of data elements based on the specified data object definition provided in the standard syntax wrapped query. The data storage query platform tool 30a returns 56 the common query results structure to the calling routine. In the above example, the objects mentioned are those produced using the referenced technique. Other techniques would produce corresponding objects with corresponding properties.

The data storage query platform tool 30a provides wrapped queries that are in a standard syntax query language used to execute queries against cloud data storage, as described above. The standard syntax wrapped query can be expressed via a Java application programming interface (API) or a string-based query. Both techniques are equivalent for expressing a query, and both are executed within the data storage query platform tool 30a.

The standard syntax wrapped query expressed via a Java API uses a Java "Query" object where query semantics are expressed using a "builder pattern" approach. (Builder pattern approach is a common software development pattern that is an object creation software design pattern that separates construction of a complex object from the object representation.

The standard syntax wrapped query expressed via the string-based query language uses a parsing tool that takes as input a grammar that specifies a language and generates output for a recognizer for that language. The language is specified using a context-free grammar which is expressed using Extended Backus-Naur Form (EBNF). An exemplary tool is "ANTLR" (ANother Tool for Language Recognition) that generates lexers, parsers, tree parsers, and combined lexer-parsers. The parsers are used to automatically generate a textual version of standard syntax based on the Java API. A SQL-like (structured query language) syntax is used here as developers may be familiar with the SQL standard.

By producing an overarching API, querying is delegated to the specific data storage entity type that enables a developer to obtain advantages from all of the various types of storage platforms used in the data fabric, without the complexities of understand and writing queries for each specific storage platform.

Below are query examples of the standard syntax wrapped query language: NOTE: The examples below are written using pseudo code. Lines beginning with "//" are comments. The "dataFabric" reference is to the platform component platform 14e. Using the Java API requires the creation of a Query object specifying the desired data entity (ML data entity).

Once the Query object is created, the various query options can be configured and the query executed. The query execution returns a standard QueryResult object. The examples below demonstrate several typical query constructs. The examples below are equivalent to the string-based query examples that follow these examples.

An example of the Java API query construct is shown below in Table 3.

```
// Create a Query object from Data Fabric for use by Java API
Query<School> query = dataFabric.createQuery(School.class);
// Define the query filter using the Java API
query.where(School.NAME.contains("Medical"));
// Common query results structure containing a collection of School
// objects where the school name contains "Medical"
QueryResult<School> queryResult = query.execute( );
RowSet<School> schools = queryResult.getEntities( );
// Redefine the query filter using the Java API
query.where(School.NUM__STUDENTS.atLeast(2500));
// Common query results structure containing a collection of School
// objects where the school has at least 2500 students
QueryResult<School> queryResult = query.execute( );
RowSet<School> schools = queryResult.getEntities( );
// Redefine the query filter using the Java API
query.where(School.TYPE.is("engineering"))
    .and(School.NUM__STUDENTS.atLeast(1000));
// Common query results structure containing a collection of School
// objects where the school type is "engineering"
// and the school has at least 1000 students
```

-continued

```
QueryResult<School> queryResult = query.execute( );
RowSet<School> schools = queryResult.getEntities( );
// Redefine the query filter using the Java API
query.where(School.NUM__STUDENTS.atLeast(1000))
    .and(School.TYPE.is("engineering").or(School.TYPE.is("science")))
    .limit(10)
    .orderByDesc(School.NUM__STUDENTS);
// Common query results structure containing a collection of School
// objects for the top 10 schools based on number of students
// where the school has at least 1000 students
// and the school type is "engineering" OR "science"
QueryResult<School> queryResult = query.execute( );
RowSet<School> schools = queryResult.getEntities( );
// Create a facet Query object from Data Fabric for use by Java API
Query<School> facetQuery = dataFabric.createQuery(School.class)
    .facetBy(School.TYPE)
    .avg(School.NUM__STUDENTS)
    .range(School.NUM__STUDENTS, 0,500,1000,2500,*);
// Define the query filter using the Java API
facetQuery.where(School.REGION.is("east"));
// Common query results structure containing a collection of School
// objects where the school is in the "east" region and a set of faceted
// metrics showing the average number of students for each school type
// and showing the school type along with the number of students in each
// range of (0-500, 501-1000, 1001-2500, 2500 and up)
QueryResult<School> queryResult = facetQuery.execute( );
// Retrieve the collection of schools in the "east" region
RowSet<School> schools = queryResult.getEntities( );
// Retrieve the facet metric results for average number of students per
// school type and for the ranges of students per school type
Collection<Metrics> facetMetrics = queryResult.getMetrics( );
```

Using the string-based query language requires the product of a string object specifying the desired query using the defined query syntax to provide all of the query options. Once the query string is produced, the query is executed. The query execution returns a standard QueryResult object. The examples below demonstrate several typical query constructs. The examples below are equivalent to the Java API examples above.

An example of the string based query construct is shown below in Table 4.

```
// Define a string-based query with the following meanings:
// * Begins with "SELECT * FROM" to select all data entities
// * "app.school" specifies the KML data entity's
"schema.entityType"
// * "WHERE ..." provides the filter
String queryString = "SELECT * FROM app.school WHERE name
CONTAINS 'Medical'";
// Common query results structure containing a collection of School
// objects where the school name contains "Medical"
QueryResult<School> queryResult =
dataFabric.executeQuery(queryString);
RowSet<School> schools = queryResult.getEntities( );
// Redefine the query
queryString = "SELECT * FROM app.school WHERE
num__students >= 2500";
// Common query results structure containing a collection of School
// objects where the school has at least 2500 students
QueryResult<School> queryResult =
dataFabric.executeQuery(queryString);
RowSet<School> schools = queryResult.getEntities( );
// Redefine the query
queryString = "SELECT * FROM app.school WHERE type =
'engineering' AND num__students >= 1000";
// Common query results structure containing a collection of School
// objects where the school type is "engineering"
// and the school has at least 1000 students
QueryResult<School> queryResult =
dataFabric.executeQuery(queryString);
RowSet<School> schools = queryResult.getEntities( );
// Redefine the query
queryString = "SELECT * FROM app.school WHERE
num__students >= 1000 " +
```

```
        "AND (type = 'engineering' OR type = 'science') " +
            "LIMIT 10 ORDER BY num_students DESC";
    // Common query results structure containing a collection of School
    // objects for the top 10 schools based on number of students
    // where the school has at least 1000 students
    // and the school type is "engineering" OR "science"
    QueryResult<School> queryResult =
    dataFabric.executeQuery(queryString);
    RowSet<School> schools = queryResult.getEntities( );
    // Define a string-based faceted query with the following meanings:
    // * Begins with "SELECT * FROM" to select all data entities
    // * "app.school" specifies the KML data entity's
        "schema.entityType"
    // * "FACET BY type" defines the facet field
    // and "AVG(num_students)" defines an AVG metric for the facet
    // field and "RANGE(num_students [0,500,1000,2500))" defines a
        RANGE metric for the facet field
    // * "WHERE ..." provides the filter
    String queryString = "SELECT * FROM app.school " +
            "FACET BY type, AVG(num_students),
    RANGE(num_students [0,500,1000,2500)) " +
            "WHERE region = 'east'";
    // Common query results structure containing a collection of School
    // objects here the school is in the "east" region and a set of faceted
    // metrics showing the average number of students for each school
    // type and showing the school type along with the number of stu-
        dents
    // in each range of (0-500, 501-1000, 1001-2500, 2500 and up)
    QueryResult<School> queryResult =
    dataFabric.executeQuery(queryString);
    // Retrieve the collection of schools in the "east" region
    RowSet<School> schools = queryResult.getEntities( );
    // Retrieve the facet metric results for average number of students per
    // school type and for the ranges of students per school type
    Collection<Metrics> facetMetrics = queryResult.getMetrics( );
```

Figure 7:
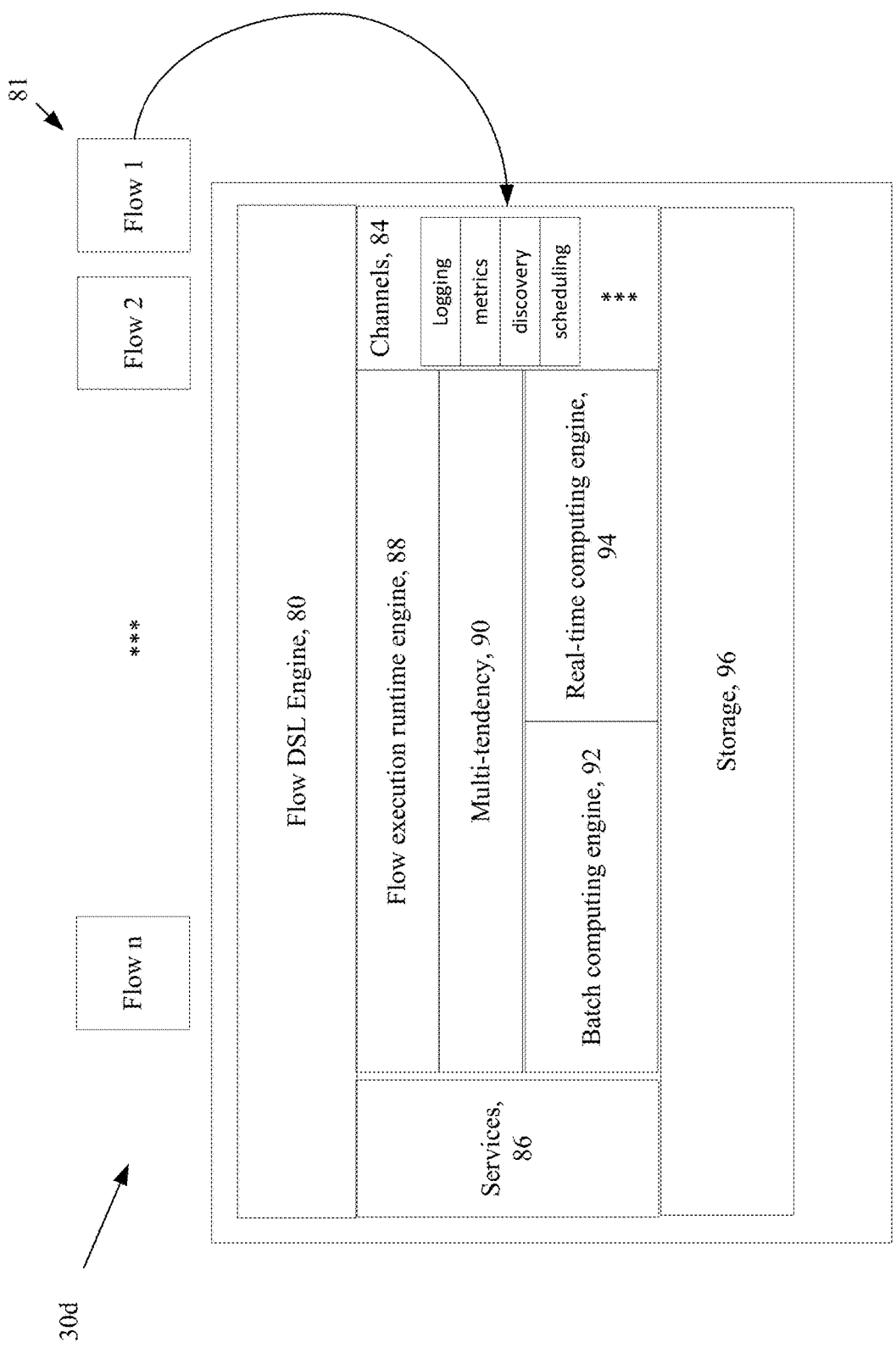
FIG. 7 is a block diagram showing an example of an automated workflow processor

Referring now to FIG. 7, an event driven computing platform 30c executes on one of more of devices of FIG. 1 for producing workflows is shown. The event driven computing platform 30c includes a DSL flow engine 80. The DSL flow engine 80 is written in a platform independent language such as Java. The application level 16 uses a domain specific language (DSL) to specify the business logic. The DSL flow engine 80 is responsible for interpreting the DSL specified in application level 16. Examples of possible DSLs include Java and Javascript and additional languages may be used. DSL is a type of computer language that is specialized to/for a particular application domain. DSL is in contrast to a general-purpose language (GPL) that would be broadly applicable across domains. GPL in general would lacks some specialized features that would be applicable to a specific domain. Whereas, DSL for that specific domain would include specialized features for the specific domain. An example of a DSL language is HTML "HyperText Markup Language" the standard markup language used to produce Web pages.

The event driven computing platform 30c also includes channels 84 and services 86. Services 86 are provided to the applications 16 to express business logic in a clear and comprehensive manner. The list of services provided include clean access to storage 96 (e.g., cloud storage above), based on multi-tenancy, notification services (e.g., send SMS, Short Message Service a text-based messaging service component of phone, Web, or mobile communication systems, email etc. to clients and send commands to devices of users for future execution (such as updates to installed software to current versions, etc.)

These services are meant for solving common use-cases for the recipes, e.g., a notification service so that the recipes writers do not have to build and configure one to send notifications through channels like email, SMS, Twitter, etc.

The event driven computing platform 30c also includes a flow execution runtime engine 88, a multi-tenancy 90, a batch computing engine 92, e.g., an Apache Hadoop, and a real-time computing engine 94, e.g., an Apache Storm as well as the storage 96, e.g., cloud storage, e.g. 12c. The Flow execution runtime engine 88 is responsible for receiving input events 81 (e.g. Flow 1). The Flow execution runtime engine 88 analyzes each event and determines workflows to be executed for the event. Real-time/non-real-time workflows are forwarded to real-time/non-real-time engines respectively along with the event for execution.

Multi-tenancy module is a series of components, such as authentication, encryption, etc. and in effect forms a security model that is provided within platform 30d to ensure individual tenant' privacy and security. On a given channel 84 (e.g., a logging channel), events (e.g. Flow 1) for multiple users would be arriving at platform 30d. The multi-tenancy model 90 ensures that event designated for tenant "A" are never assigned to a workflow belonging to any other tenant. This module ensures that the privacy is maintained at storage 96. Data stored by tenant A cannot be seen by any other tenant.

Input flows, e.g., flow 1 to flow n (generally 81) are received by the event driven computing platform 30c via the channels 84. The channels 84 are configured to receive specific types of input. That is, each channel 84 is configured for a specific type of function and accordingly receives input corresponding to that function. The correct channel is determined when an event (e.g. Flow 1) is fed into a channel, because the event is produced with the channel name. This way, the event is routed to the correct channel. More specifically, the channel is determined based on the event (or flow's) metadata that contains the channel name. Channels 84 can include for example modules configured for logging events, calculating metrics, discovery, scheduling, and so forth, as shown. The individual pieces of information arriving on these channels are known as events and every channel defines the specific format of the event received by the channel. A channel configured for discovery, is a channel where events for network resources are published, events such as resource added, resource removed, resource updated status.

Each channel refers to a logical functionality of the event driven computing platform 30c. The channel "discovery" deals exclusively with events related to identification of devices in the end-users' computer network. Thus, a "discovery" event would contain information like nature of event (device added/removed), device OS, device RAM, device IP address etc. The channel "metrics" deals exclusively with events related to any system statistics updates from end-users' machines. Thus, a "metrics" event would contain information like—CPU usage %, RAM usage %, network usage statistics etc.

Thus, each channel depending upon the functionality it supports requires different information in the input event. The event format refers to all the different information which an event may contain and the nature of each piece of information (CPU usage % is a number, device OS is a string etc.) This is defined by the channel. Event producers would know how to prepare the event payload. The users who write the routines know how to expect in the incoming event.

Users write routines that represent specific transformations applied to the events. The routine(s) are written to accept event(s) as input and in the appropriate execution environment, the routines apply the user-defined transformation(s) as defined in the routine(s) to the event. The user-written routines can be written in either Java® or JavaScript® or another non-platform specific programming language. Routines can invoke other routines to form a routine chain, i.e., a routine Directed Acyclic Graph (routine DAG). Users defined chains of routines or routines can be designated by a user as a workflow. User-written routines are stored in storage 96 (e.g., 12c of FIG. 4). User-specified routine chains and workflows are also stored in storage 96 (e.g., 12c of FIG. 4).

As the routines represent specific user-specified transformations of events that are inputted to channels, the routine(s) accept event(s) at the specific channels for the event type. The routine(s) are executed in the appropriate execution environment to apply to the event, the user-defined transformation(s) as defined in the routine(s).

Figure 8:
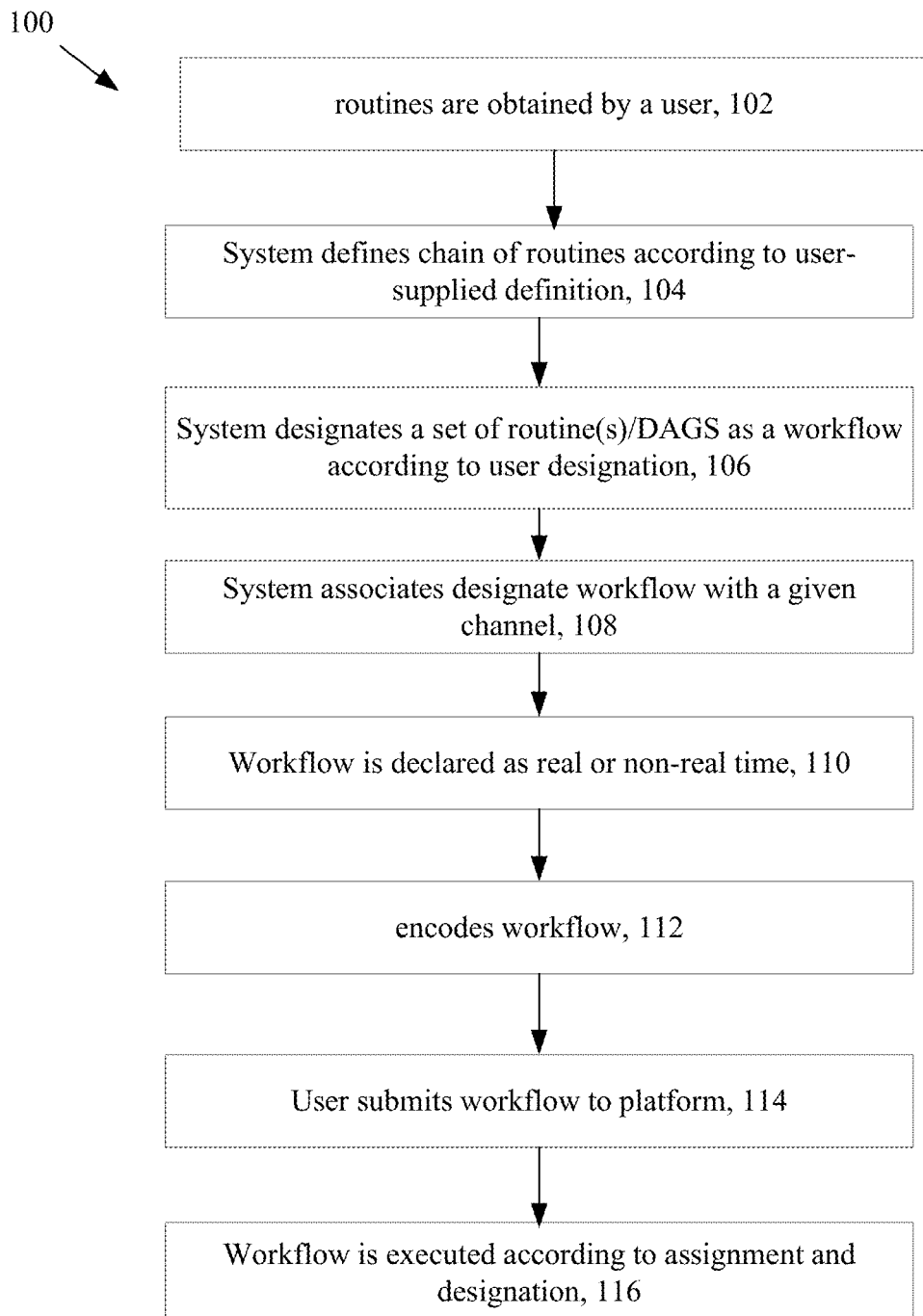
FIG. 8 is a flow diagram showing an example process of producing a workflow.

Referring now to FIG. 8, an example of an automation processing flow 100 executed on event driven computing platform 30c is shown. The event driven computing platform 30c obtains 102 routines according to user requirements. Routines are obtained such as by searching for routines in storage and/or by a user writing new routines. The system produces 104 chains of at least two routines according to received user supplied definitions of chains of routines. Routine chains or (DAGS), are structures of routines. The event driven computing platform 30c produces 106 a workflow according to received user-supplied designation of a given routine/DAG as a workflow. The event driven computing platform 30c associates 108 the designated workflow with a given channel. The event driven computing platform 30c applies 110 a declaration of the designated workflow as either a real-time workflow or non-real-time, i.e., batch process workflow according to a user-supplied designation. Workflow metadata contains workflow type information (e.g., batch/real-time) information.

The event driven computing platform 30c encodes 112 the workflow to produce a human-readable format and a machine-readable format for the workflow. A mark-up language such as Standard Extensible Markup Language (XML) is used to encode the workflow. XML is a markup language that defines a set of rules to encode documents in a format that is human-readable and machine-readable. Users on the event driven computing platform 30c submit 114 these routines and the workflow to the automation service platform 30d.

Many such routines and workflows can be produced. Such routines/workflows are executed 116 in the event driven computing platform 30c, using either the real-time computing engine 94 (FIG. 7) or the non-real-time, i.e., batch computing engine 92 (FIG. 7) according to the designation of the workflows.

Standard Extensible Markup Language (XML) is used to encode the workflow. XML is a markup language that defines a set of rules to encode documents in a format that is human-readable and machine-readable. Users submit the machine readable version of these routines and workflows to the automation service platform 30 for execution.

The routines work across both real-time and non-real-time platforms and thus can be re-used to provide both real-time and non-real-time workflows. While the underlying real-time and non-real-time engines are different engines (e.g., Apache Storm and Apache Hadoop, respectively), the end-user functionality is abstracted to accommodate execution of the routines on either of these different platforms. This feature enables the reuse of the routines across multiple workflows and platforms. Flow execution runtime engine 88 serves as an abstraction over batch and real-time runtime environments. Flow execution runtime engine 88 provides a consistent (abstract) runtime environment to workflow and recipes. What that basically means is that a recipe/workflow can run as either a batch or real-time entity without any modifications.

Figure 9:
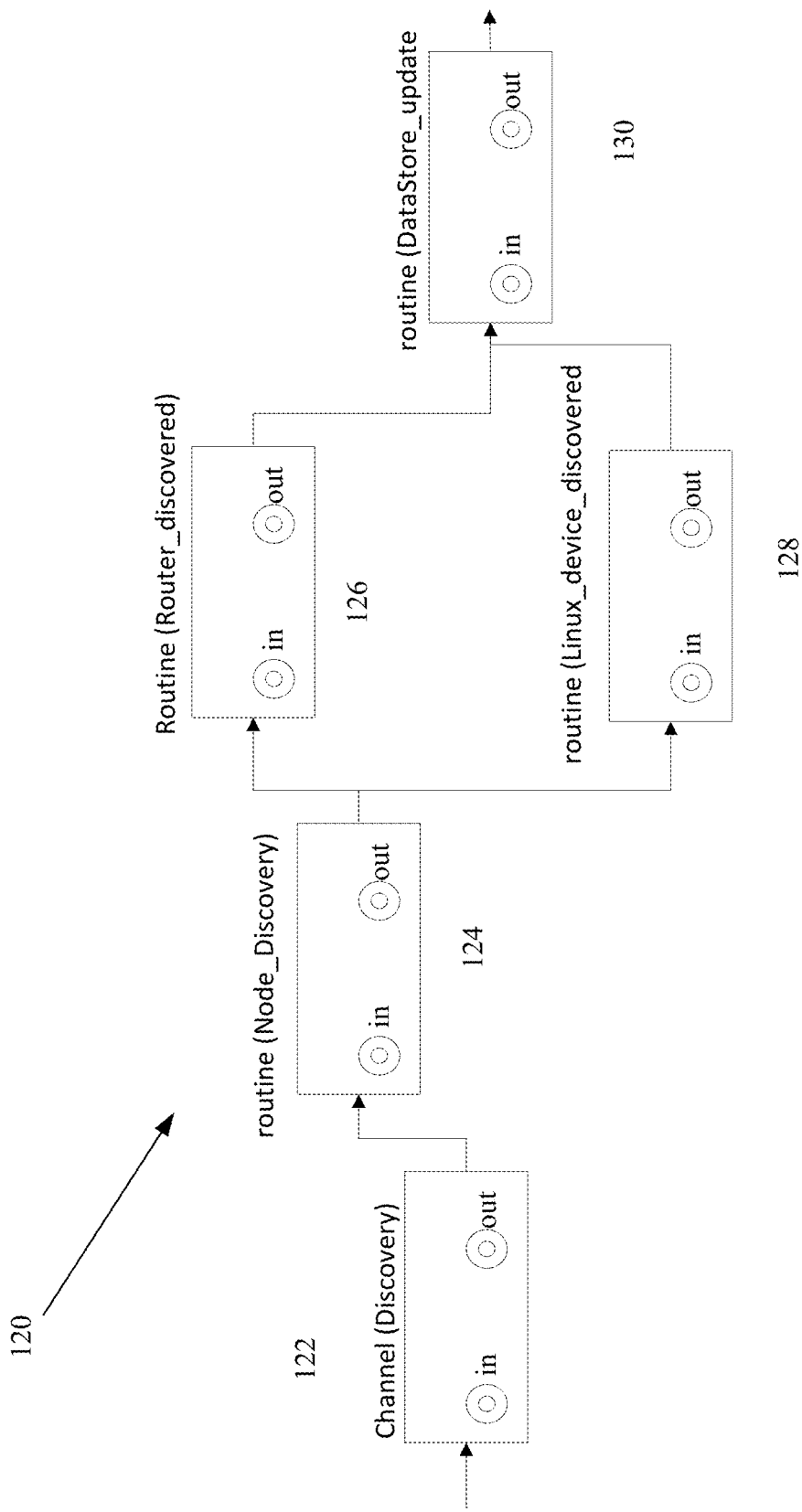
FIG. 9 is a schematic block diagram of a workflow.

Referring now also to FIG. 9, an example of an automation service—event workflow 120 is shown. The workflow 120 includes three routines with a channel assignment. The first module 122 depicts channel assignment. In workflow 120 the channel assignment is "discovery." Module 122 represents code written in Java to retrieve flows from the queue, de-serialize retrieved flows and pass the de-serialized flows to designated workflows to be executed with the flow data as parameters. The channel module smartly manages the rate of de-queuing, retrieving only those numbers of flows that will not overwhelm the event driven computing platform 30c. Module 122 includes an input 122a that receives appropriate ones of the events (FIG. 2), the module 122 processes the received event(s) according to the function defined in the module 122 and passes the processed event to an output 122b.

The routines 124, 126, 128 and 130 are produced by a user writing specific operations to process individual events, as discussed above. When writing routines a user can invoke another routine that the user had already written or which the user retrieves from storage.

As illustrated in FIG. 9, the user has formed a set of the routines 124, 126, 128 and 130 into a routine chain or Directed Acyclic Graph (DAG) that such user has defined into the workflow 120. The routines 124, 126, 128 and 130 used could have been submitted by other users and stored in storage 46 by the automation service platform 30 and retrieved by the current user or could have been produced by the current user.

In the example of FIG. 9, routine 124 is a node discovery routine. This is a routine that is used to process discovery events and categorize discovery events into different buckets for example, router discovered/lost, Linux node discovered/lost events. Routine 126 is a router discovered routine that contains the processing instructions for converting router discovery events into device inventory update events. Routine 128 is a Linux device discovery routine that contains processing instructions for converting Linux device discovered event into a device inventory update event. Routine 130 is a data store routine that processes a device inventory update event and performs actual database updates. The overall function of workflow 120 therefore would be to track all discovery channel events and prepare an inventory of devices that were processed from these events.

The routines are configured such that the same routine can be applied to events that are executed by either the real-time or non-real-time engines depending on the event. Execution in the real-time or batch (non-real-time) engine depends on how a user configures the workflow. A workflow is configured for which engine the workflow is executed. For the same given input event, a user may define two workflows, one workflow that executes in a real-time engine, and another workflow that executes in a batch or non-real-time engine.

When a channel is activated, the automation service starts receiving input events on that channel. Activation of a channel allows the real-time engine to start "listening", i.e., detecting incoming events to the activated channel. Thereafter, any events posted on the activated channel are received by the flow execution runtime engine 88. When an event arrives, the flow execution runtime engine 88 analyzes the event. Each event carries the tenant ID, (information that uniquely identifies a tenant.) An event also carries the device and the payload information associated with the event.

The payload contains miscellaneous information specific to the event, other than Tenant ID and optionally Device ID. Within the platform 30 each tenant is identified by a unique Tenant ID (a random Universal Unique Identifier). These Tenant IDs are stored in storage 96. Each event contains this tenant information embedded in it. The device information is an arbitrary string that is filled in by the event producer. The device information generally is not consumed directly by the event driven computing platform 30c. Payload information is an arbitrary table of key-value pairs, where a key is a Java language string and a value is a Java language object again defined by the event producer.

The flow execution runtime engine 88 retrieves the event information one or more of Flows 81, and for a given event, e.g., Flow 1, the flow execution runtime engine 88 retrieves from storage 96 all relevant workflows that operate on that type of event for the given event. Each workflow depending on whether the workflow is a real-time workflow or not is processes the input event, e.g., Flow 1, via either the real-time computation engine (e.g., Apache Storm) 94 or the batch computation engine (e.g., Apache Hadoop) 42.

In the real-time computation engine 94, the input event, e.g., Flow 1, is passed directly to the provided workflow and all associated routines in the workflow are executed in real-time.

In the batch computation engine 92, the input event, e.g., Flow 1, actually points to the actual source of data for the workflow and a query is sent to the database storage 96 for a pre-existing file that contains the data that will be used by the event. The data source information (query statement, an arbitrary file) can be provided either in the event or defined in the workflow metadata. In the latter case, the event acts as a "trigger" to initiate the workflow. The batch computation engine 92 analyzes the input event and initializes the actual input to the workflow. The batch computation engine 92 sets up reading of the input file by initializing the query based on the input parameters provided. All of the events from the input are provided to the workflow and all the associated routines are executed in the batch computation engine.

The event driven computing platform 30c process for executing workflows that express business logic can be view as input data flowing through a sequence of transformations. Users specify the business logic at each transformation stage (routines) and uses have the computing system chain these transformations (to form routine chains) together to achieve a final result that is designated by the system as a workflow. The routines are stored in storage and are reusable/shareable. A routine can be a part of any number of workflows. This approach leverages a scalable and distributed complex event processing infrastructure and provides an ability to support a very large number of simultaneous events (per tenant or across tenants). All of the system level requirements like scalability/reliability are taken care of by the platform. Thus, end users focus on their domain problems rather than system level issues.

By employing the event driven computing platform 30c these techniques provide a programming interface to using DSL to interface with execution engines, e.g., real-time or batch. The use of DSL makes it easier to express exact business requirements in a clear and concise language and can assist end-users to write IT-management workflows in a rapid and reliable manner.

Figure 10:
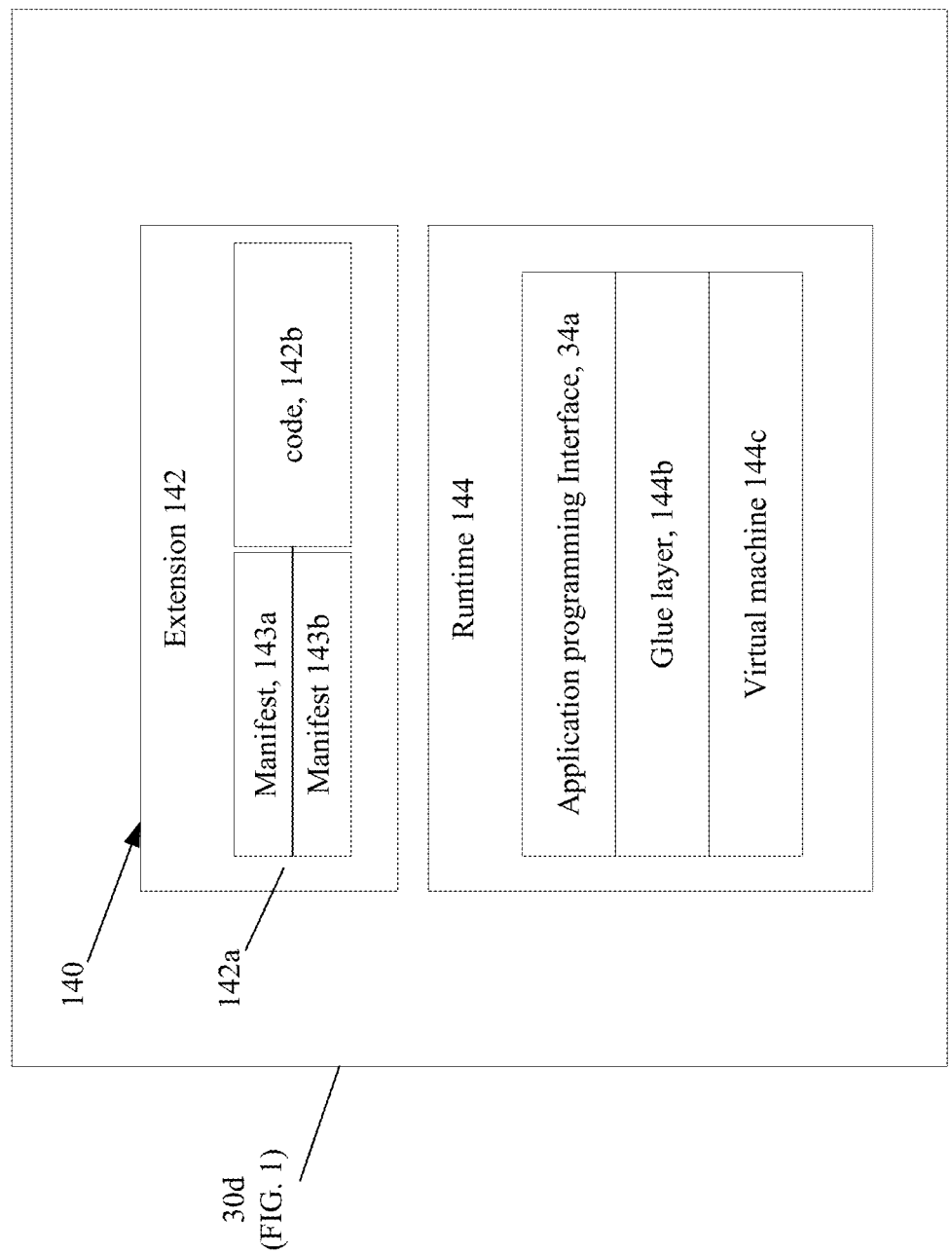
FIG. 10 is a block diagram showing an example of a secure script package with an extension.

Referring now to FIG. 10, an extension structure platform tool 30d produces a programming structure 140 that is a secured script package with an extension for enabling secure, portable cross platform management with runtime executables. The programming structure 140 is executable on various endpoint devices, e.g., 20a (which is one or more of the devices 20 in FIG. 1). The programming structure 140 includes/contains an extension structure 142 and a conventional runtime structure 144. The device 20a includes processor/memory (not shown, but as in FIG. 14, for example).

The extension structure 142 includes a manifest structure 142a and executable code 142b (e.g., producer code that will remotely perform/execute a function/task on a managed device). The extension structure 142 also includes the manifest structure 142a that is packaged with the code 142b. The manifest structure 142a contains two versions of a manifest, a human readable manifest 143a and a machine readable manifest 143b. Both the human readable manifest 143a and the machine readable manifest 143b are programmatically generated from source code (not shown, but being the source code that was compiled to produce the code 142b) and packaged in/with the extension 142. The human readable manifest 143a enables an end-user of an end-user device to determine whether it is safe/desirable to use the extension 142 on the end-user device. The machine readable version 143b is used to load the only those functions listed in the manifest, which functions are part of the code in the extension 142. The machine readable manifest is used to strip out function calls from loaded libraries to make it impossible to call a function that is not in the manifest presented to the user. This is to protect both the vendor and customer from malicious exploits. The manifests are in essence a listing of permitted procedure calls. The machine readable version 143b provides a security measure to minimize the chance of introducing unwanted behavior of the code 142b in the extension 142.

The runtime structure 144 includes an application programming interface 144a, a glue layer 144b and a virtual machine 144c. The virtual machine (VM) 144c executes the code 142b, and the glue layer 144b provides an application programming interface (API) access from the virtual machine 144c that contains cross platform functions used by the code 142b to access and manipulate the device on which the code 142b in the programming structure 140 executes outside of the virtual machine 144b.

Figure 11:
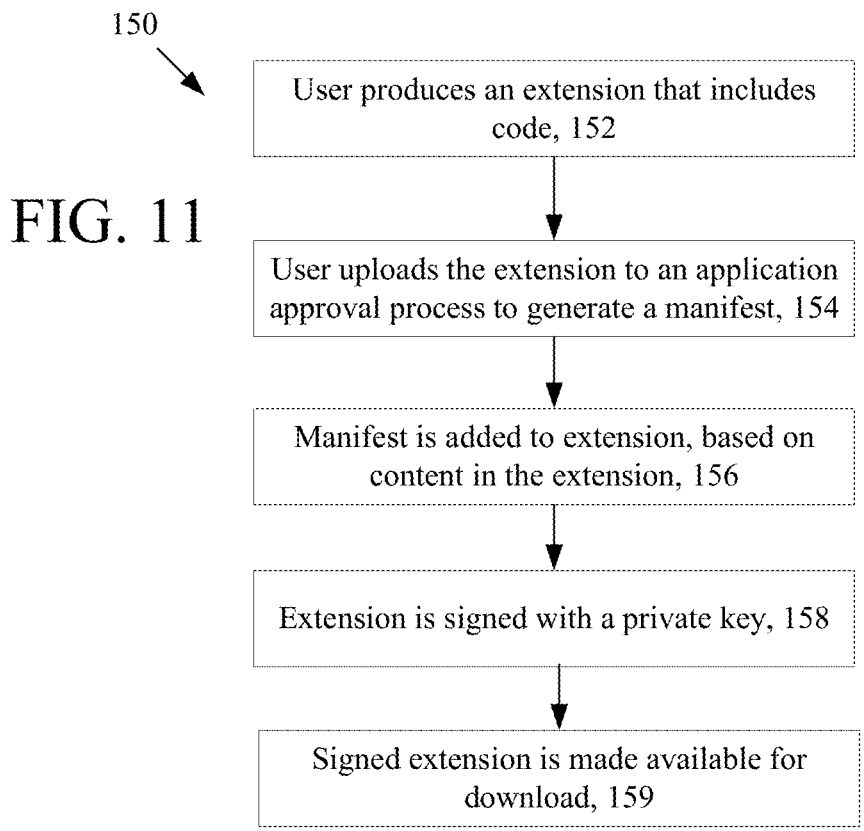
FIG. 11 is a flow diagram showing an example process of producing the secure script package with extension.

Referring now to FIG. 11, processing 150 executed by extension structure platform tool 30d for developing an extension and deploying the extension into production is shown. A user that is referred to as a producer user or simply a producer, produces 152 on a computing device using any well-known or otherwise scripting program editor (not shown) the code 142b. The extension 142 once produced will contain one or more script parts or "scripts" that when executed in the runtime environment will cause one or more actions to be executed on an end-user device. A "script" can consist of one file or can include many files.

Once the produced, in order to be used by others the extension 142 is first approved. Thus, producer uploads 154 the extension 142 to an application approval process to generate a manifest structure 142a. The upload of the finished script is for approval. The approval process generates 154 a manifest 142 that is inspected by an operator that also reviews the script and signs 158 the reviewed script by applying a first digital signature that is generated before the package is made available for download.

The application approval process validates 156 the extension 142 and generates a manifest file 143a that describes the function(s) of the extension in human readable form. The application approval process also generates a manifest file 143b that describes the function(s) of the extension in machine readable form. The extension 142, with the manifest structure 143*a* and the code 143*b* are signed by the private key (first digital signature). The different components in the package are signed as a whole, that is the extension 142 is signed as a whole. In other implementations, the individual components could be signed with different digital signatures. However, this would entail additional management overhead of the different digital signatures. The extension 142 is stored in storage in the cloud or elsewhere.

Thereafter, the extension is made available 159 to users to download, using any conventional technique that publicizes the existence of the extension and that enables downloading to authorized devices. Signing the extension with the private key (first digital signature) makes it possible to detect any changes in the extension and prohibit its use on a target machine. Signing of the extension in general will not prevent changes as anyone can still edit the file. However, the signing process can detect that the package was changed since it was originally packaged and the system can prevent use of the improperly edited extension.

Figure 12:
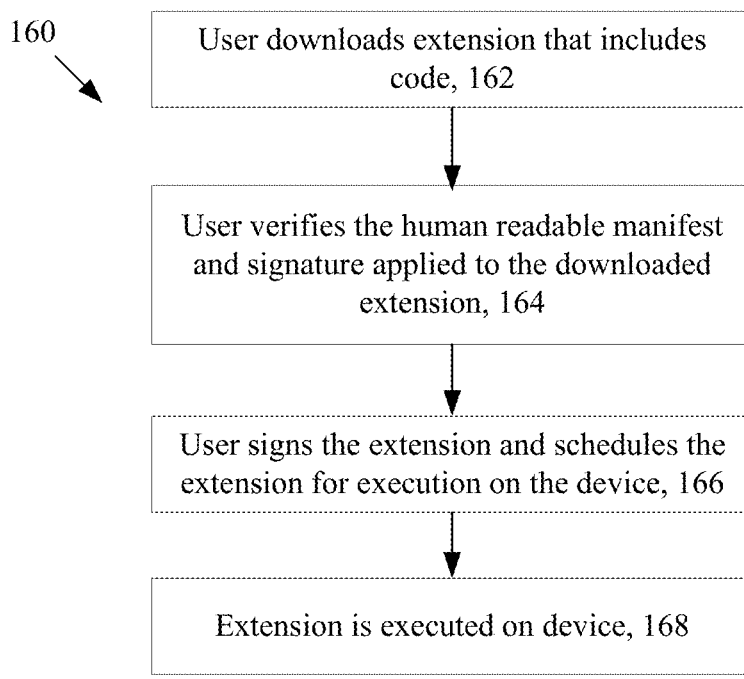
FIG. 12 is a flow diagram showing an example process of executing the secure script package with extension.

Referring now to FIG. 12, in order to use 160 the extension 142, a user downloads 162 the extension 142 that includes the code 142*b* and the manifest structure 142*a*. The runtime structure 144 (FIG. 10) is presumed to already exist on the user device. After download, the user validates 164 the content of the extension by using a second, digital signature provided to enable the user to access the manifest 163*a*. That is, by applying the provided signature, the user can extract the manifest 163*a*. The extension 142 is bundled in an archive that contains the script code 142*b*, manifest 143 and additional signature files (not shown). The download mechanism displays the human readable manifest in for example a browser by accessing it from the archive directly. The format of the human readable manifest can be a simple text file, html file, pdf file or any other type of document file. The user reviews the extracted human readable manifest. Based on the human readable manifest, the end-user can decide that the extension includes code that the end-user will allow to execute on the end-user device.

The end-user signs 166 the extension 32 using the end-user's own private key (third digital signature), acknowledging to the system, e.g., cloud computing environment 10 that this particular package of this version is intended to be used in the customer's network. The third digital signature wraps (one or more) archive(s) into a new archive together with the second digital signature. The first and third digital signatures have different purposes. The first digital signature is placed to ensure that no one tampers with the package (while the package is stored on download server or in transit to a customer) and that this package has been approved for distribution to customers. The third digital signature is generated (by the customer) to approve the extension(s) for use within the customer's network and that by signing indicating to other systems in the customer's network that the package is safe to use. The user may schedule the extension for execution on any of the endpoints in the network. The endpoints will be able to verify that the extension is indeed approved for execution by verifying the third signature.

A solution to the problem of securing scripts for remote execution is delivered in one package. The integrity of the package can be checked to detect if the package has been tampered with, while, the end-user is presented with a human readable information in the form of the manifest 33*a* about what action the code in the extension will be perform. Thus, the manifest 33*a* enables the runtime environment to only load the API functions used by the code. This further prevents the possibility by either accident or by through a security hole, to run a function not documented by the manifest and intended by the original author. There is a formal process for the user to implement a package, by signing it, the action prohibit not authorized personnel from deploying new packages. The package can be executed on any type of endpoint.

Figure 13:
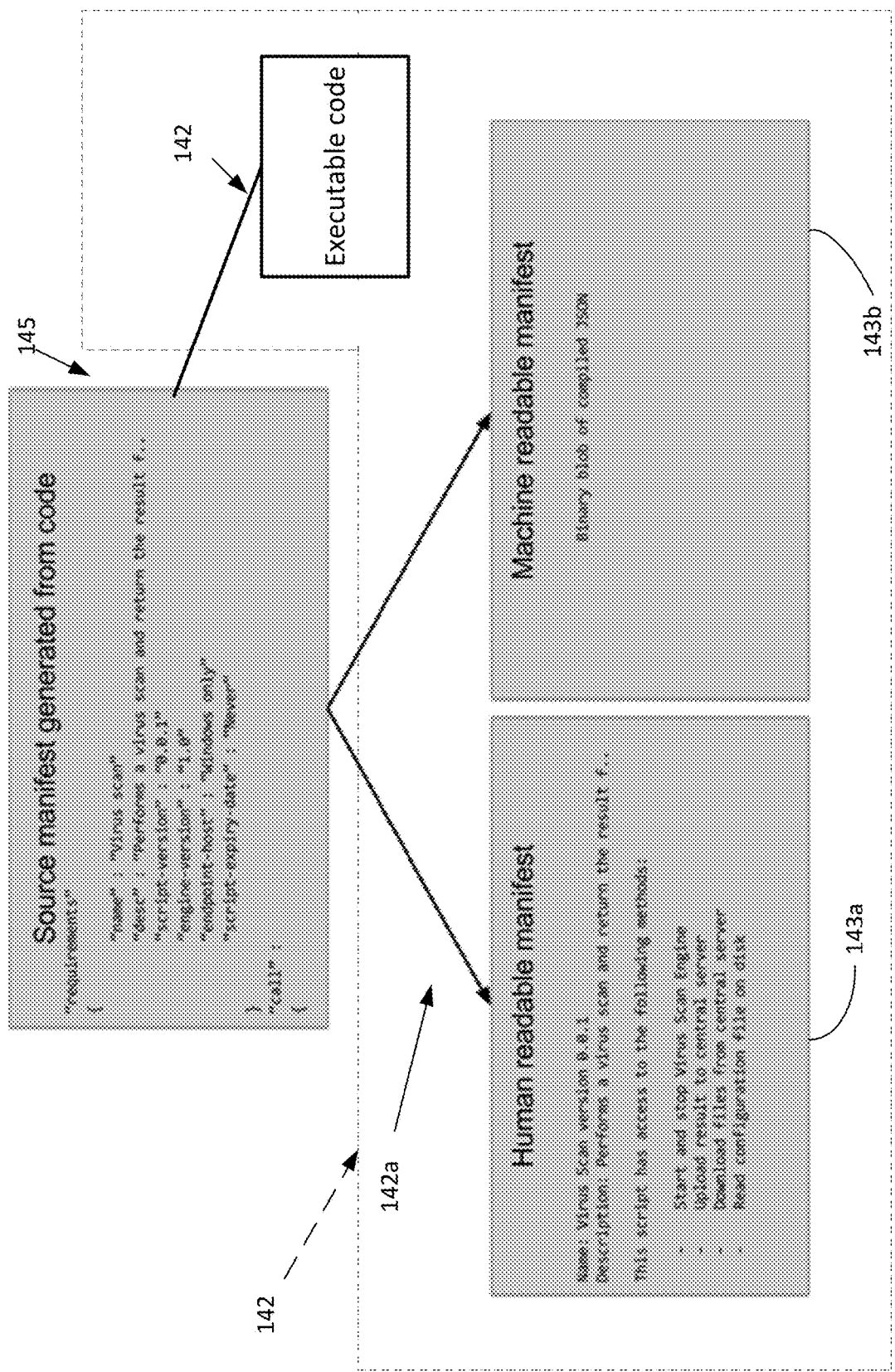
FIG. 13 shows an exemplary manifests.

Referring now to FIG. 13, the extension 142 is generated from source code 145. The extension 142 includes executable code 142*b* and manifest 142*a*. The manifest includes a human readable manifest 143*a* and a machine readable manifest 143*b* produced from the code, which are descriptions of versions of scripts (code 142*b*) to execute. From the source code the human readable manifest 143*a* is generated. The machine readable manifest 143*b* is a simple binary of complied code corresponding to the human readable manifest 143*a*.

Terms used herein include: Extension a complete package of one or more scripts source files, machine readable manifest, human readable manifest and signature in one binary. Virtual machine or VM, a program language in byte code. Application Program Interface or API an appropriate set of routines, protocols, and tools for construction of a software application that expresses software components in terms of operations, inputs, outputs, and underlying types. Runtime is the VM, API and management code compiled into an executable. Manifest structure is a combination of a human readable print-out (ex. PDF file) that states the intention of the scripts and a machine readable (ex. JSON file) that the runtime can use to load necessary functions from the API. Script is a language file containing a program. Key is a private or public key component, as appropriate, and used to produce a signature and to validate a package. Endpoint is any type of network connected device.

Figure 14:
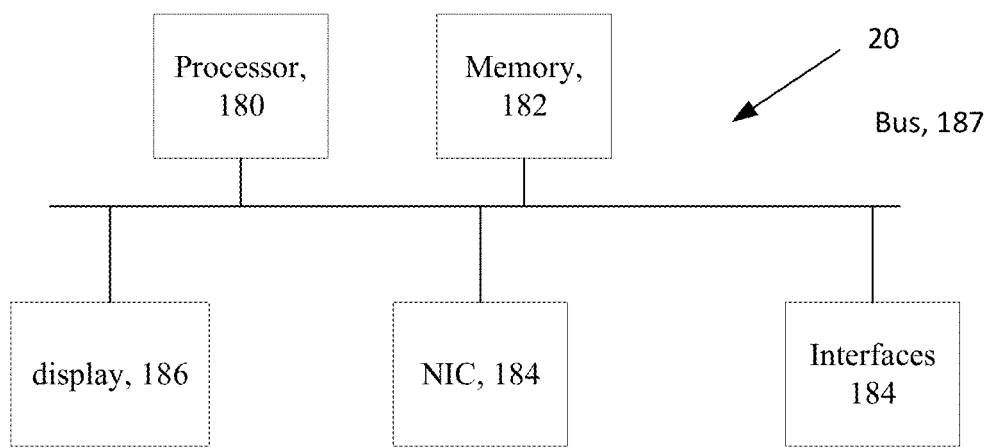
FIG. 14 is a schematic block diagram of a user device.

Referring now to FIG. 14, a typical target device 20 is shown. The typical target device can be a computer system, handheld computing device, server computer, etc. and includes processor 180, memory 182 operatively associated with the processor 180, a network interface card 184 and other interfaces such as to a keypad, as well as a display 186.

In a networking context, the term "cloud" may include a variety of services and applications that reside outside of hardware that is managed or controlled by the end-user. There are several scenarios that illustrate this concept, such as a website where users access web applications, or an online library where a database resides in a centralized or distributed external location rather than on the user's computers. The traditional architecture for this paradigm is usually a user interface (UI), where the external users connect, via an application program interface (API), to some type of database to manage the information. The user interface submits requests via an API to a cloud server. Typically, each of these requests is processed by modular programs called "agents" or "workers" that run on the cloud-based server, and not in the users' computer. These agents may execute tasks assigned by the users, for example, to query the database or to execute a complex operation involving data and user input.

Network devices may include one or more processing devices (e.g., microprocessors, programmable logic, application-specific integrated circuits, and so forth) for executing the instructions to perform all or part of their corresponding functions described herein. In some implementations, the structure of different devices may be the same or about the same, or the structures of different devices may be different. Each device, however, is programmed with appropriate functionality.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

In example implementations, each of the devices/systems described can include non-transitory machine-readable media that is volatile and non-volatile computer memory (not shown) to store executable instructions. Each of the devices/systems also include one or more processing devices (e.g., microprocessors, programmable logic, application-specific integrated circuits, and so forth) for executing the instructions to perform all or part of their corresponding functions described herein. In some implementations, the structure of different devices may be the same or about the same, or the structures of different devices may be different. Each device, however, is programmed with appropriate functionality.

Memory stores program instructions and data used by the processor of device. The memory may be a suitable combination of random access memory and read-only memory, and may host suitable program instructions (e.g. firmware or operating software), and configuration and operating data and may be organized as a file system or otherwise. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Servers include one or more processing devices (e.g., microprocessors), a network interface and a memory (all not illustrated). Servers may physically take the form of a rack mounted card and may be in communication with one or more operator terminals (not shown). The processor of each server in communication with, and controls overall operation, of each server. The processor may include, or be in communication with, the memory that stores processor executable instructions controlling the overall operation of the monitoring server.

Each server may be associated with an IP address and port(s) by which it communicates with user devices. The server address may be static or dynamic addresses, and associated with static domain names, resolved through a domain name service.

The network interface card interfaces with the network to receive incoming signals, and may for example take the form of an Ethernet network interface card (NIC). The servers may be computers, thin-clients, or the like.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Although certain embodiments of the methods and systems are described, variations can be included into these embodiments, or other embodiments can also be used. Other embodiments are within the scope of the following claims. Computer listings follow the specification.

What is claimed is:
1. A system comprising:
a processor device;
a memory in communication with the processor device; and
a storage device that stores a program of computing instructions for execution by the processor using the memory, the program comprising instructions configured to cause the processor to:
receive by the system from a different system, files including one or more source code files, and one or more script files that when executed in a runtime environment will cause one or more actions to be executed on an end-user device;
generate a manifest structure from the source code files, with the manifest structure including:

a human readable manifest file that describes the function(s) of the script files in human readable form; and a machine readable manifest file that is a version of the human readable manifest file that describes the function(s) of the script files in machine readable form;

produce a programming structure comprising the manifest structure and the received source code files and script files, with the programming structure further comprising a runtime structure that includes an application programming interface and a virtual machine that executes the executable code; and a glue layer that provides the application programming interface access from the virtual machine; and apply a private key as a digital signature to the programming structure to provide an approved, encrypted portable cross platform programming structure in a complete package of the script files, source code files, machine readable manifest file, and human readable manifest file.

2. The system of claim 1 wherein to generate the manifest structure, the system is further configured to:

programmatically generate the human readable manifest file and the machine readable manifest file from source code in the source code files that was used to produce the scripts.

3. The system of claim 1 wherein the human readable manifest file enables an end-user to determine contents of the approved, encrypted portable cross platform programming structure and the machine readable manifest file enables the end-user device to load only those functions listed in the machine-readable manifest file that are part of the executable code in the approved, encrypted portable cross platform programming structure, effectively stripping out function call(s) from loaded libraries to prevent execution of a function call that are not in the human readable manifest file presented to the user.

4. The system of claim 1, further configured to:
store the approved, encrypted portable cross platform programming structure into a storage structure; and
publicize availability of the stored approved, encrypted portable cross platform programming structure.

5. The system of claim 1, further configured to:
receive a download request for the approved, encrypted portable cross platform programming structure.

6. The system of claim 1 wherein the manifest structure has the human readable file as a PDF (portable document format) file and the machine readable file as a JSON (JavaScript Object Notation) file.

7. A method comprises:
receiving by one or more computers from a different system files including one or more source code files, and one or more script files that when executed in a runtime environment will cause one or more actions to be executed on an end-user device;

generating by the one or more computers a manifest structure from the source code files, with the manifest structure including:

a document that is a human readable manifest file that describes the function(s) of the extension in human readable form; and a machine readable manifest file that is a version of the human readable manifest file that describes the function(s) of the extension in machine readable form;

producing by the one or more computers, a programming structure comprising the manifest structure and the received source code files and script files, with the programming structure further comprising:

a runtime structure that includes an application programming interface and a virtual machine that executes the executable code; and a glue layer that provides the application programming interface access from the virtual machine; and receiving by the one or more computers, a private key that is applied as a digital signature to the programming structure to provide an approved encrypted portable cross platform programming structure in a complete package of the script files, source code files, machine readable manifest file, and human readable manifest file.

8. The method of claim 7 wherein generating the manifest structure, comprises:

programmatically generating the human readable manifest file and the machine readable manifest file from the source code used to produce the script files.

9. The method of claim 7 wherein the human readable manifest file enables an end-user to determine content of the extension and with the method further comprising:

loading by the end-user device only those functions listed in the machine readable manifest file that are part of the executable code in the approved, encrypted portable cross platform programming structure, effectively stripping out function call(s) from loaded libraries that are not in the human readable manifest file presented to the user.

10. The method of claim 7 further comprising:
storing by the one or more computers, the approved, encrypted portable cross platform programming structure into a storage structure; and
publicizing by the one or more computers availability of the stored approved, encrypted portable cross platform programming structure.

11. The method of claim 7 further comprising:
receiving by the one or more computers a download request for the approved, encrypted portable cross platform programming structure.

12. A method comprises:
receiving by a first system over a network, an approved encrypted portable cross platform programming structure that includes a runtime environment that includes:
an application programming interface;
a glue layer; and
a virtual machine that executes the executable code, with the glue layer providing the application programming interface (API) access from the virtual machine that contains cross platform functions used by the executable code to execute outside of the virtual machine, with the approved encrypted portable cross platform programming structure comprising executable code, a manifest structure that includes:

a human readable manifest file corresponding to the executable code, which the human readable manifest file describes the function(s) of the approved, encrypted portable cross platform programming structure in human readable form; and a machine readable manifest file that is a version of the human readable manifest file that describes the function(s) of the approved, encrypted portable cross platform programming structure in machine readable form, with the extension signed by a first digital signature using a first private key;

receiving by the first system, a second digital signature that is applied to the approved, encrypted portable cross platform programming structure;

extracting by the first system from the approved, encrypted portable cross platform programming structure, the human readable manifest file to enable inspection of the human readable manifest file on the first system;

rendering the human readable manifest file in a browser;

applying by the first system to the extension, a third digital signature, to approve the extension for use; and publicizing availability of the approved, encrypted portable cross platform programming structure.

13. The method of claim 12 wherein the machine readable manifest file effectively strips out function calls from loaded libraries to prevent a function call that is not in the human readable manifest file.

14. The method of claim 12 wherein the manifest structure has the human readable file as a PDF (portable document format) file and the machine readable file as a JSON (JavaScript Object Notation) file.

15. The method of claim 12 wherein the network is a customer network and the approved, encrypted portable cross platform programming structure is received by the first system from one or more computer systems in the customer network.

16. A computer program product tangibly embodied on a digital hardware storage device, the computer program product for producing a secure, portable cross platform programming structure, the computer program product comprising instructions for causing a processor to:

receive files including one or more source code files, and one or more script files, with the script files including one or more script(s) that when executed in a runtime environment will cause one or more actions to be executed on an end-user device;

generate a manifest structure from the source code files, with the manifest structure including:
  a human readable manifest file that describes the function(s) of the script(s) in human readable form; and
  a machine readable manifest file that is a version of the human readable manifest file that describes the function(s) of the script(s) in machine readable form;

produce a programming structure comprising the manifest structure and the received source code files and script files with the programming structure further comprising a runtime environment that includes:
  an application programming interface;
  a glue layer; and
  a virtual machine that executes the executable code in the approved, encrypted portable cross platform programming structure, with the glue layer providing the application programming interface (API) access from the virtual machine that contains cross platform functions used by the executable code to execute outside of the virtual machine; and apply a private key as a digital signature to the programming structure to provide an encrypted portable cross platform programming structure in a complete package of the script files, source code files, machine readable manifest file, and human readable manifest file, in one binary.

17. The computer program product of claim 16 wherein instructions to generate the manifest structure comprises instructions to:
programmatically generate the human readable manifest file and the machine readable manifest file from source code used to produce the executable code in the extension.

18. The computer program product of claim 16 wherein the human readable manifest file enables an end-user to determine content of the approved, encrypted portable cross platform programming structure and the machine readable manifest file enables the end-user device to load only those functions listed in the machine-readable manifest file that are part of the executable code in the approved, encrypted portable cross platform programming structure, effectively stripping out function call(s) from loaded libraries to prevent execution of a function call that are not in the human readable manifest file presented to the user.

19. The computer program product of claim 16 further comprises instructions to:
  store the approved, encrypted portable cross platform programming structure into a storage structure; and
  publicize availability of the stored programming structure.

20. The computer program product of claim 16 further comprises instructions to:
  receive a download request for the approved, encrypted portable cross platform programming structure.

21. The computer program product of claim 16 wherein the manifest structure has the human readable file as a PDF (portable document format) file and the machine readable file as a JSON (JavaScript Object Notation) file.

22. A system comprising:
  a processor device;
  a memory in communication with the processor device; and
  a storage device that stores a program of computing instructions for execution by the processor using the memory, the program comprising instructions configured to cause the processor to:
  receive executable code as script files and corresponding source code files;
  encapsulate the executable code into a programming structure by instructions to:
    generate a manifest structure from the source code files, the manifest structure including:
      a human readable manifest file that describes function calls made by the executable code; and
      a machine readable manifest file that describes the function calls of the extension in machine readable form, with the machine readable manifest file used by a user device to load into the user device only those function calls listed in the machine readable manifest file that are part of the executable code in the extension generated from the source code files;
  produce the programming structure comprising the manifest structure the received files, and a runtime environment that includes:
    an application programming interface;
    a glue layer; and
      a virtual machine that executes the executable code in the approved, encrypted portable cross platform programming structure, with the glue layer providing the application programming interface (API) access from the virtual machine that contains cross platform functions used by the executable code to execute outside of the virtual machine;
  encrypt the produced programming structure with a private key that is applied as a digital signature to at least a portion the produced programming structure to provide an encrypted portable cross platform programming structure in a complete package of the script files, source code files, machine readable manifest file, and human readable manifest file; and post the approved, encrypted portable cross platform programming structure for download to user devices/ systems.

23. The system of claim 22 wherein the human readable manifest file enables an end-user to determine contents of the approved, encrypted portable cross platform programming structure and wherein by effectively stripping out function calls from loaded libraries prevents execution of a function call that is not in the human readable manifest file presented to the user.

24. The system of claim 22 wherein the applied digital signature is applied to the entire approved, encrypted portable cross platform programming structure by using the private key to produce the complete package.

25. The system of claim 22 wherein the private key is a first private key that is applied to a first portion of the programming structure, and a second different portion is digitally signed by using a second, different private key that is applied to the second different portion of the programming structure.

26. The system of claim 22 wherein the manifest structure has the human readable file as a PDF (portable document format) file and the machine readable file as a JSON (JavaScript Object Notation) file.

* * * * *